(12) United States Patent
McKay

(10) Patent No.: US 7,364,380 B2
(45) Date of Patent: Apr. 29, 2008

(54) GROOMING/CLEANING APPARATUS

(75) Inventor: William D. McKay, Grand Blanc, MI (US)

(73) Assignee: The Hartz Mountain Corporation, Secaucus, NJ (US)

( * ) Notice: Subject to any disclaimer, the term of this patent is extended or adjusted under 35 U.S.C. 154(b) by 521 days.

(21) Appl. No.: 10/851,503

(22) Filed: May 21, 2004

(65) Prior Publication Data

US 2005/0066464 A1    Mar. 31, 2005

Related U.S. Application Data

(63) Continuation-in-part of application No. 10/717,956, filed on Nov. 20, 2003, now abandoned, which is a continuation-in-part of application No. 10/672,909, filed on Sep. 26, 2003, now Pat. No. 7,234,188.

(51) Int. Cl.
*A47L 1/08*    (2006.01)
*A45D 44/18*    (2006.01)

(52) U.S. Cl. .................. 401/138; 401/39; 401/129; 401/139

(58) Field of Classification Search .................. 401/39, 401/129, 138, 139; 15/169, 246, 160, 187, 15/104.002; 132/119
See application file for complete search history.

(56) References Cited

U.S. PATENT DOCUMENTS

| | | | |
|---|---|---|---|
| 717,377 A | 12/1902 | Flanders | |
| 2,127,886 A | 8/1938 | Plon | |
| 2,363,647 A | 11/1944 | Cosin | |
| 2,529,927 A | 11/1950 | Fisk | |
| 2,694,826 A | 11/1954 | Blakely | |
| 2,708,765 A * | 5/1955 | Vann | 15/246 |
| 2,888,698 A | 6/1959 | Kaye et al. | |
| 2,920,334 A | 1/1960 | Keller | |
| 2,922,180 A | 1/1960 | Render | |
| 3,011,499 A | 12/1961 | Tajan | 401/139 |
| 3,034,376 A | 5/1962 | Gonzalez | |
| 3,056,154 A | 10/1962 | Neal | 15/104 |
| 3,060,485 A | 10/1962 | Butter et al. | |
| 3,102,544 A | 9/1963 | Keegan et al. | 132/147 |
| 3,128,487 A | 4/1964 | Vallis | |
| 3,158,887 A | 12/1964 | Kanbar et al. | 15/104 |
| 3,299,461 A | 1/1967 | Marks | 15/104 |
| 3,373,457 A | 3/1968 | Rouch, Jr. | 15/104 |
| 3,665,543 A | 5/1972 | Nappi | 15/215 |
| 3,755,847 A | 9/1973 | Liebscher | |
| 3,798,698 A | 3/1974 | Conklin, Jr. | |
| 3,833,008 A | 9/1974 | Blackett, Jr. | |
| 4,062,083 A | 12/1977 | McKay | 15/106 |
| 4,107,811 A | 8/1978 | Imsande | 15/215 |
| 4,244,587 A | 1/1981 | Schweizer | 15/104.8 |

(Continued)

FOREIGN PATENT DOCUMENTS

WO    WO 90/03130    * 4/1990

*Primary Examiner*—Khoa D. Huynh
(74) *Attorney, Agent, or Firm*—Gottlieb, Rackman & Reisman

(57) ABSTRACT

A cleaning apparatus includes a substrate with outward projecting bristles extending through a sheet or scrim impaled over the bristles. The substrate may be mounted on a support which may carry a handle. The sheets may be single sheets arranged in a stack over the bristles on one or more surfaces of the substrate or a roll of separable sheets disposed over the bristles.

11 Claims, 16 Drawing Sheets

U.S. PATENT DOCUMENTS

| | | | |
|---|---|---|---|
| 4,307,739 A | 12/1981 | Chern | |
| 4,357,730 A | 11/1982 | Lex | |
| 4,361,923 A | 12/1982 | McKay | 15/104 |
| 4,399,579 A | 8/1983 | McKay | 15/104 |
| 4,422,201 A | 12/1983 | McKay | 15/104 |
| 4,479,501 A * | 10/1984 | Chern | 132/313 |
| 4,500,939 A | 2/1985 | Gueret | |
| 4,517,703 A | 5/1985 | Koke | |
| 4,603,448 A | 8/1986 | Middleton et al. | |
| 4,727,616 A | 3/1988 | Kucera et al. | 15/104 |
| 4,742,547 A | 5/1988 | Watanabe | 15/104 |
| 4,850,073 A | 7/1989 | Preuss | 15/207.2 |
| 4,856,541 A | 8/1989 | Kellett et al. | |
| 4,884,688 A | 12/1989 | Hurst | |
| 4,905,337 A | 3/1990 | McKay | 15/104 |
| 5,002,075 A | 3/1991 | Kellett et al. | |
| 5,027,465 A | 7/1991 | McKay | 15/104 |
| D320,680 S | 10/1991 | Stetson et al. | D30/158 |
| 5,052,071 A | 10/1991 | Halm | 15/167.1 |
| 5,261,426 A | 11/1993 | Kellett et al. | |
| D342,610 S | 12/1993 | Stetson et al. | D4/122 |
| 5,327,611 A * | 7/1994 | Balster et al. | 15/160 |
| 5,392,482 A | 2/1995 | Drulias et al. | |
| 5,410,772 A | 5/1995 | Lewis | |
| D363,214 S | 10/1995 | Parola et al. | D9/300 |
| 5,519,912 A | 5/1996 | Kawamura | |
| 5,600,865 A | 2/1997 | Morrison | |
| 5,651,158 A | 7/1997 | Halm | 15/167.1 |
| 5,819,989 A | 10/1998 | Saraceni | 221/192 |
| 5,862,563 A | 1/1999 | Hartmann | |
| 5,878,457 A | 3/1999 | Cox et al. | 15/104.002 |
| 5,887,600 A | 3/1999 | Wilk | |
| 5,890,255 A | 4/1999 | Robinson | |
| 5,904,150 A | 5/1999 | Caristo et al. | |
| 5,940,921 A * | 8/1999 | Wood et al. | 15/104.002 |
| 6,006,393 A | 12/1999 | Lynch et al. | 15/144.1 |
| 6,014,788 A | 1/2000 | Jaffri | 15/104.002 |
| 6,021,542 A | 2/2000 | Norman | |
| 6,029,307 A | 2/2000 | Baudoin | |
| 6,055,695 A | 5/2000 | McKay, Jr. | 15/104.002 |
| 6,070,597 A | 6/2000 | Motherhead | |
| 6,098,635 A | 8/2000 | Marino | 132/238 |
| 6,112,362 A | 9/2000 | Parko et al. | |
| 6,127,014 A | 10/2000 | McKay, Jr. | 428/43 |
| 6,230,716 B1 | 5/2001 | Minoletti | |
| 6,280,757 B1 | 8/2001 | McAfee et al. | 424/402 |
| 6,298,517 B1 | 10/2001 | McKay | 15/228 |
| 6,325,070 B1 | 12/2001 | Tyroler et al. | 132/112 |
| 6,405,403 B1 | 6/2002 | McKay | 15/228 |
| 6,408,475 B1 * | 6/2002 | Morrison | 132/119 |
| 6,493,899 B1 | 12/2002 | Hintz et al. | |
| 6,502,585 B1 | 1/2003 | Mazzei et al. | |
| 2003/0116171 A1 | 6/2003 | Loveless | |
| 2003/0229958 A1 | 12/2003 | Thompson et al. | |
| 2004/0181892 A1 | 9/2004 | Chen | |
| 2005/0051187 A1* | 3/2005 | Koke | 132/119 |
| 2005/0055788 A1* | 3/2005 | Chang et al. | 15/186 |
| 2006/0230559 A1* | 10/2006 | Knopow et al. | 15/104.002 |
| 2006/0288512 A1* | 12/2006 | Kinchen, Sr. | 15/246 |

* cited by examiner

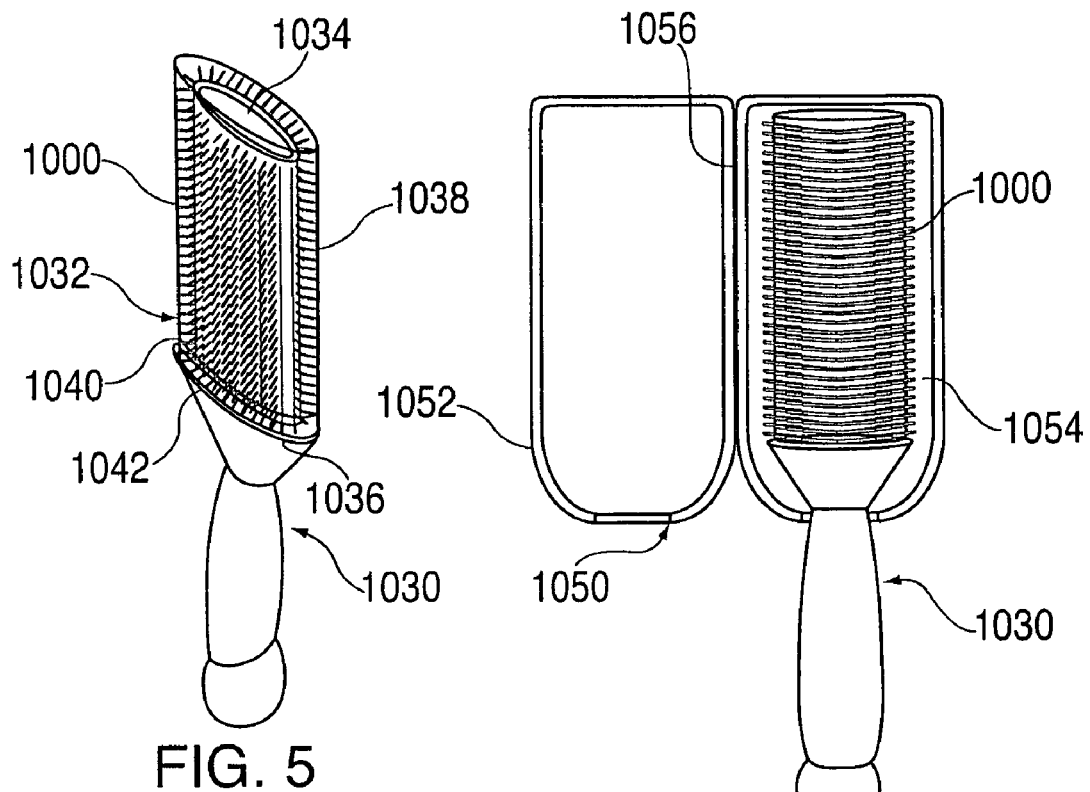
FIG. 5
FIG. 6
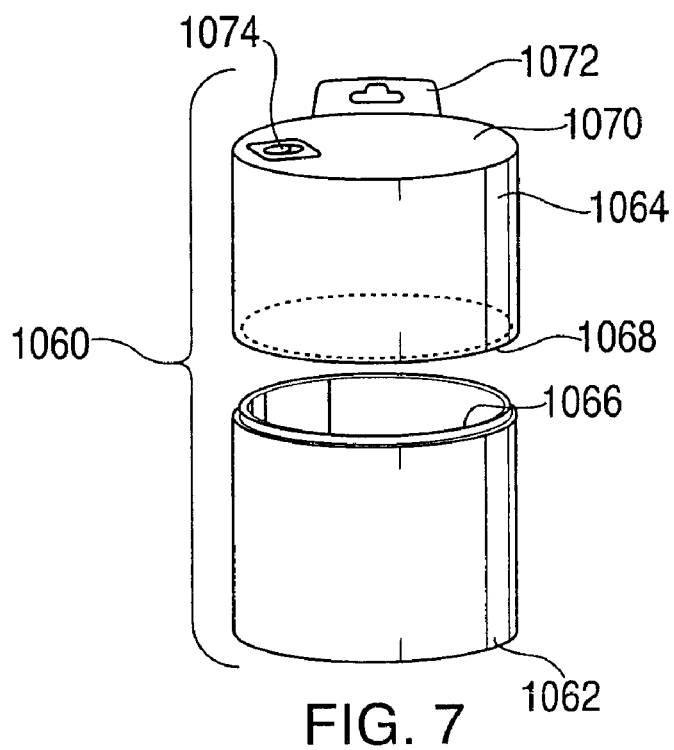
FIG. 7

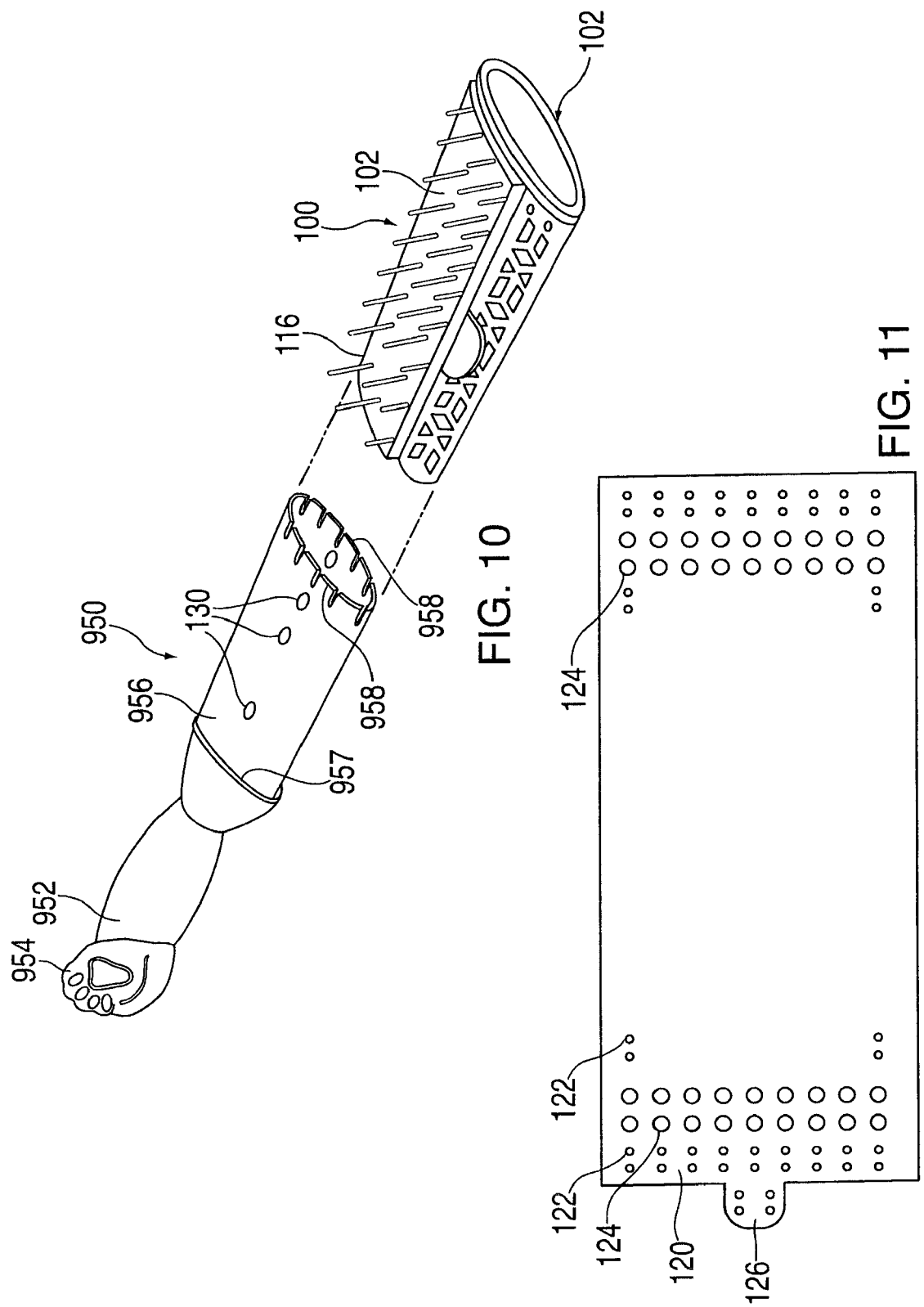

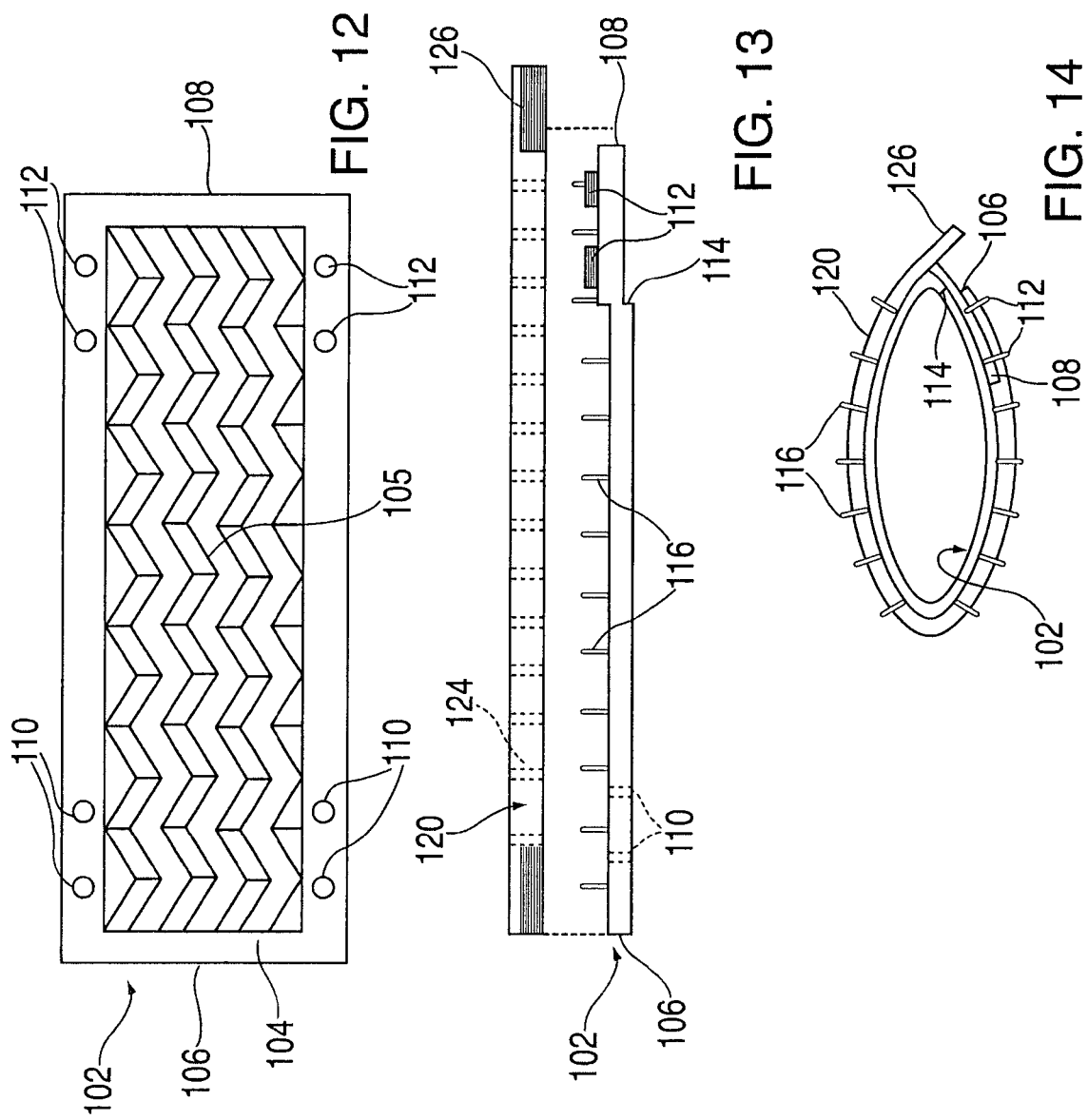

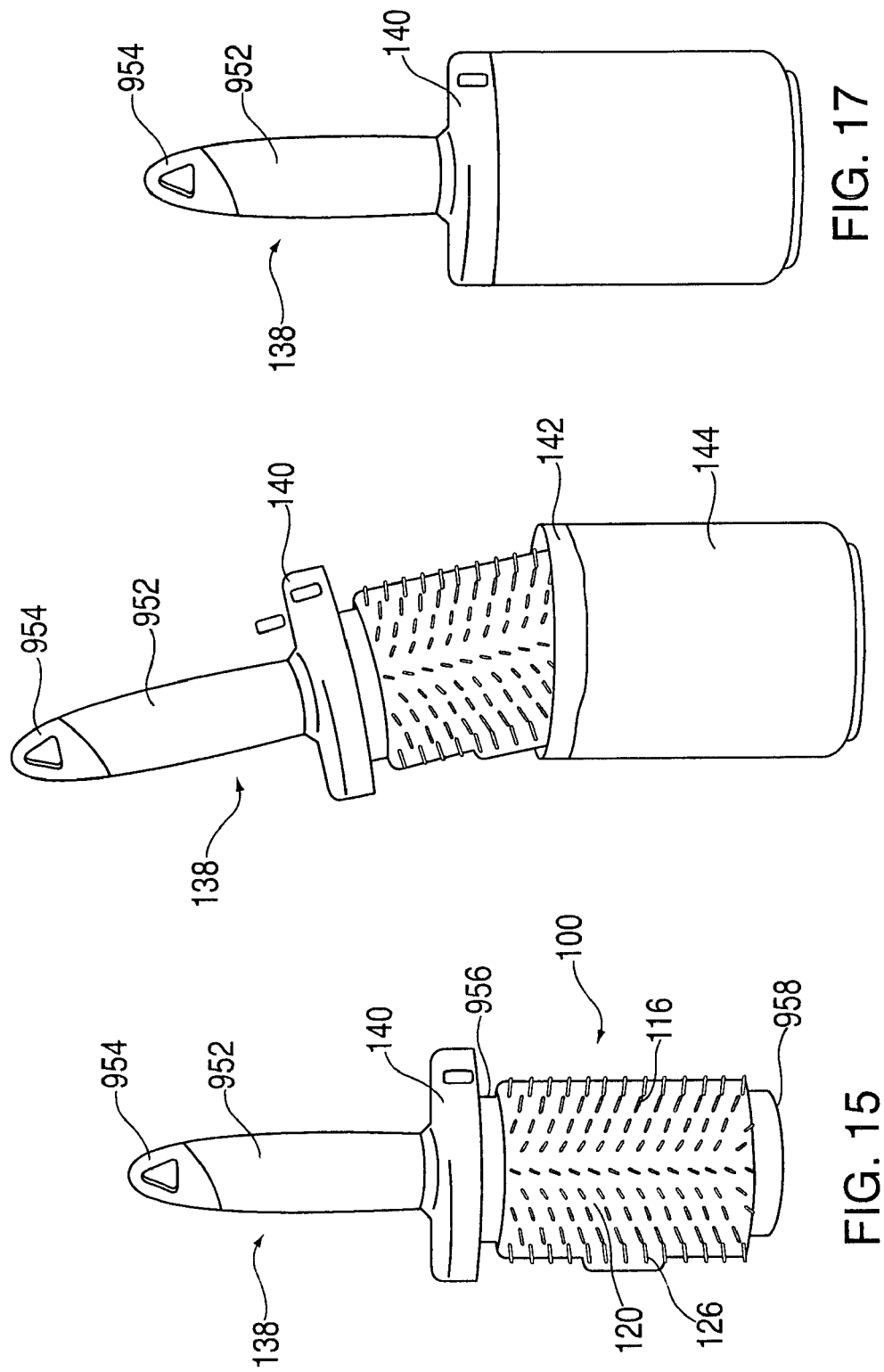

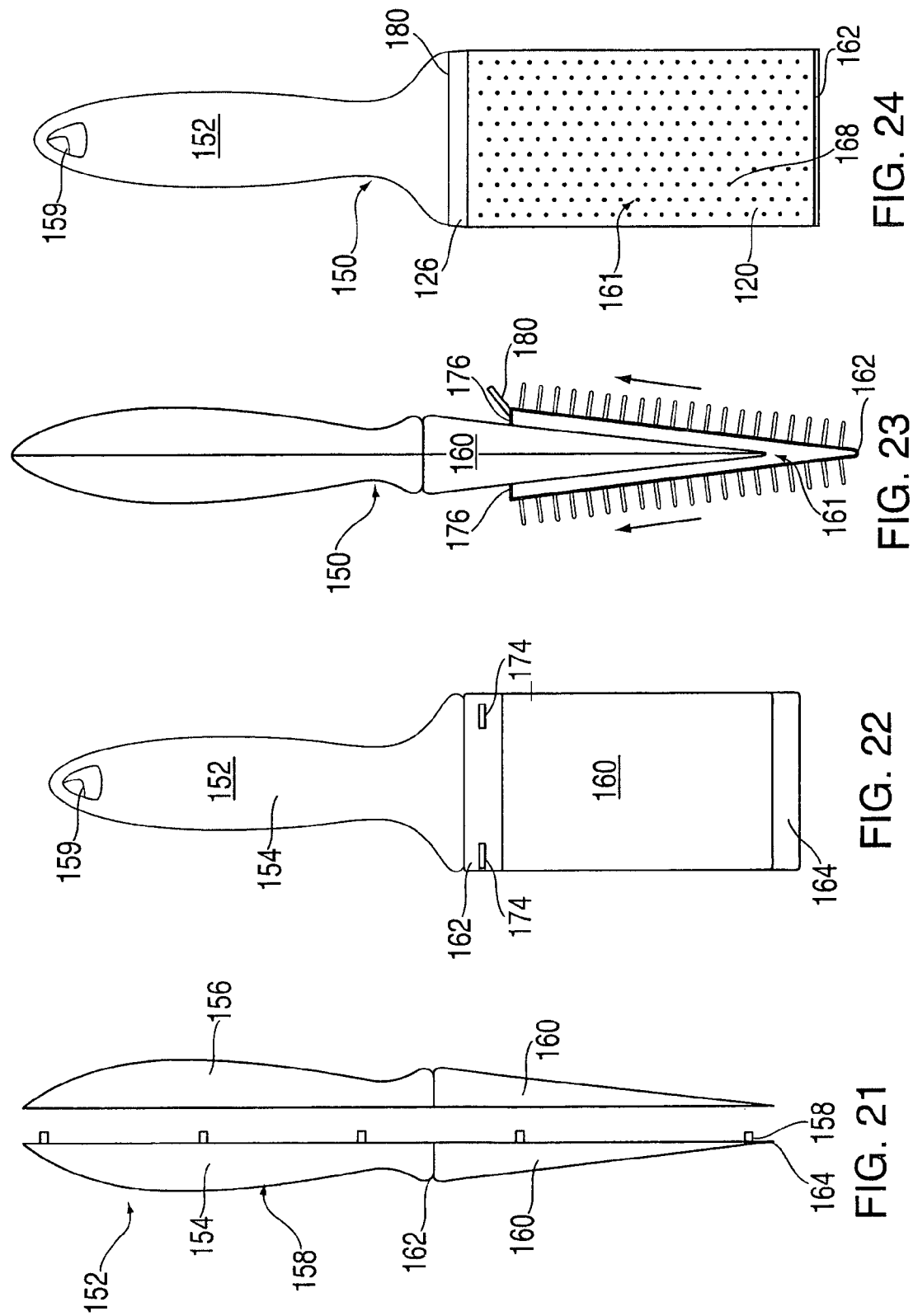

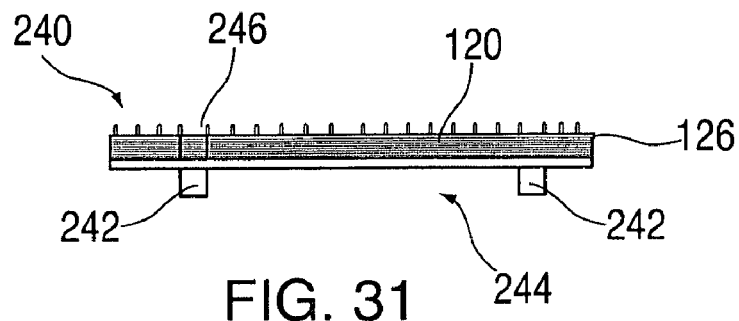
FIG. 31
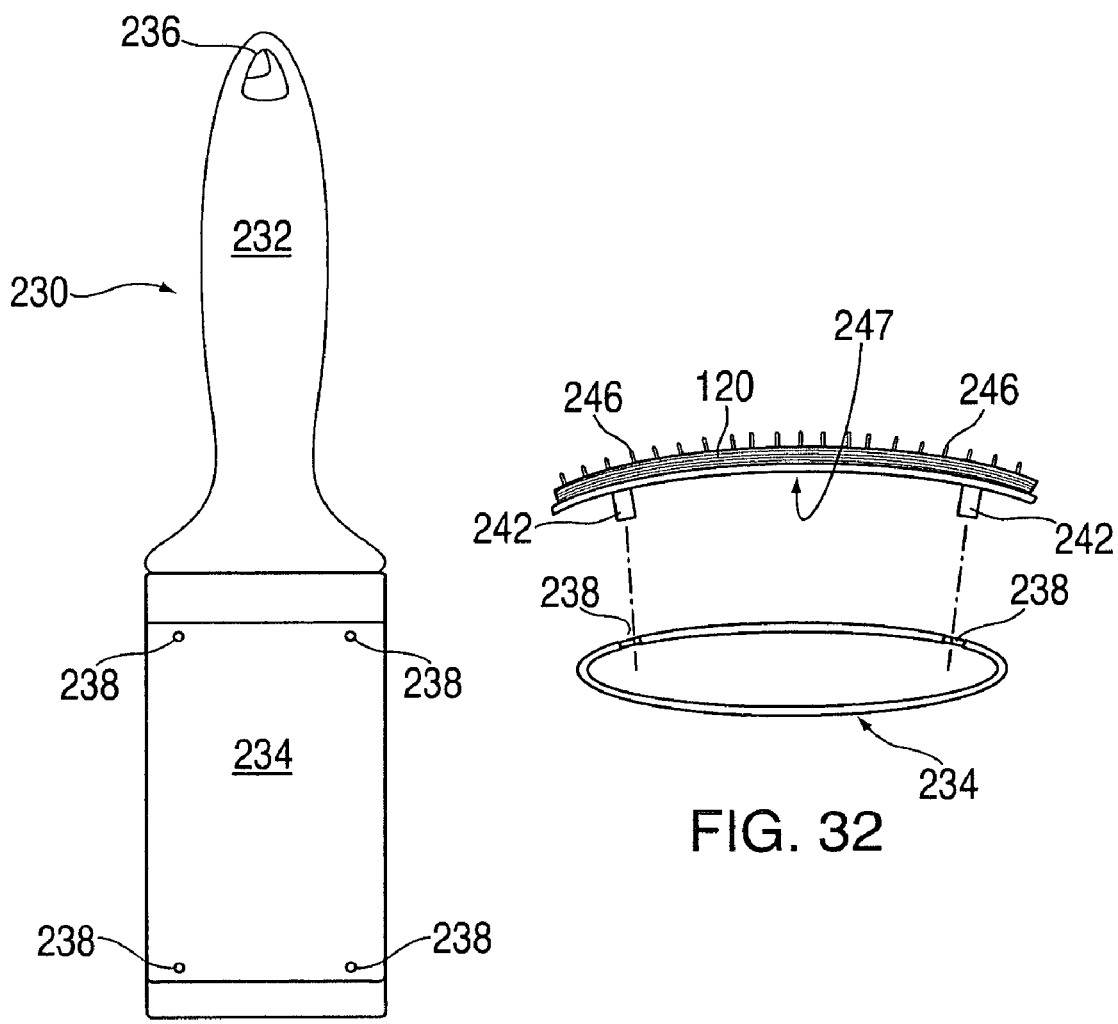
FIG. 32
FIG. 30

GROOMING/CLEANING APPARATUS

CROSS REFERENCE TO CO-PENDING APPLICATION

This application is a continuation-in-part of application Ser. No. 10/717,956, filed Nov. 20, 2003, and entitled "Grooming/Cleaning Apparatus", which is a continuation-in-part of application Ser. No. 10/672,909 filed Sep. 26, 2003, and entitled "Lint Removal Apparatus with Edge Orientation", the contents of both of which are incorporated herein in their entirety.

BACKGROUND

This invention relates to cleaning apparatus and, in particular, to cleaning and/or grooming apparatus for pets.

Lint removal tapes having an outer adhesive surface are used for picking up undesired particles from fabric, floor and other surfaces.

Some devices of the prior art illustrate the use of tape rolls which utilize specific perforation, slit, and non-adhesive edge patterns to promote easy sheet removal. Some of the tape utilizes creped paper, flat back paper, or silicone treated paper, which when becoming wet deteriorates. Other lint removers use embossed film with adhesive coating to build the roll's diameter.

Other devices known in the art utilize a rubber like sticky washable coating that is extruded onto a core and then placed onto a lint roller assembly. While this provides for cleaning the sticky roll with water it does not provide the peeling option.

Brushes for grooming human hair or animal fur which have a plurality of flexible bristles extending from one end are known. Interchangable brush heads with different bristle patterns as well as different bristle shapes, heights, stiffness, etc., which may be mounted on a common handle and head support are also known.

However, brushes which can be used for cleaning at the same time as brushing have not been previously provided. Nor have brushes been provided with wipes or fabric sheets carried on or over the bristles which can be used to apply a cleaning, medicament, grooming or other composition to hair or fur at the same time the bristles are brushing the hair or fur of a human or pet. Thus, it would be desirable to provide a grooming/cleaning apparatus which addresses the above deficiencies in the known art.

SUMMARY

In one aspect of the present invention, the cleaning apparatus includes a substrate with bristles extending therefrom. A sheet or scrim may be mounted over the bristles.

The sheet may be a fabric sheet, such as a non-woven fabric, which is dry and fluid absorbent or pre-moistened with a cleaning, deodorizing, medicament or other cleaning or grooming solutions for application to human hair or pet fur.

In another aspect, the cleaning apparatus includes a support means for supporting the substrate, and a handle coupled to the support.

In another aspect, the cleaning apparatus is a brush including a handle. Bristles are carried on the brush. A sheet or scrim is disposed about the bristles. The sheet may be dry or pre-moistened and provided with a cleaning, freshening, deodorizing, conditioning, coloring, texturing, shine enhancing, lightening, detangling, or medicament composition.

The mat or substrate with or without the sheets or scrims, may also be sold as a refill or replacement cartridge for an existing cleaning apparatus including a support and/or handle or simply for direct use as a cleaning apparatus mounted on a user's hand, or over an existing core or support previously purchased by the user. Thus, any of the inventive substrates, with or without the cleaning sheets or wipes, may be packaged and sold as a refill cartridge in a flat, extended state or with the substrate end pre-joined. Likewise, the sheets may be pre-moistened with the cleaning medium or provided in a dry state, with the cleaning medium added by the user.

The grooming/cleaning apparatus of the present invention provides numerous advantages over previously devised cleaning apparatus, especially cleaning or grooming apparatus devised for cleaning human hair or the coats of pets. The present apparatus provides an effective means for cleaning hair or fur separately or at the same time with the cleaning operation by applying a separate cleaning, deodorizing or medicament solution to the hair or fur.

BRIEF DESCRIPTION OF THE DRAWING

The various features, advantages and other uses of the present invention will become more apparent by referring to the following detailed description and drawing in which:

FIG. 5 is an elevational view of a protective cap mountable over a cleaning apparatus of the present invention;

FIG. 6 is an elevational view of the protective cap of FIG. 5 shown in and open position;

FIGS. 7 and 8 depict another aspect of a protective enclosure which can be used to ship, display and use the cleaning apparatus of the present invention;

FIG. 10 is a exploded perspective view of another aspect of a cleaning apparatus according the present invention;

FIG. 11 is plan view of a wipe mountable on the cleaning element shown in FIG. 10;

FIG. 12 is a plan view of a mat supporting the wipe as shown in FIG. 10;

FIG. 13 is an exploded, side elevational view showing the mounting of the stack of wipes on the mat of FIG. 12;

FIG. 14 is an end elevational view showing the use configuration of the mat and wipes of FIGS. 10-14;

FIG. 15 is a side elevational view of another aspect of a cleaning apparatus according to the present invention;

FIGS. 16 and 17 are side elevational view showing use of the cleaning element shown in FIG. 15 with a fluid container;

FIG. 21 is an exploded side elevational view of a two part handle and support assembly according to another aspect of the present invention;

FIG. 22 is a front elevational view of the handle and support assembly of FIG. 21;

FIG. 23 is a partially exploded, side elevational view depicting the assembly of the mat and wipes on the handle and support assembly of FIGS. 21 and 22;

FIG. 24 is a front elevational view of the assembled handle, support and wipes of FIGS. 18-23;

FIG. 30 is a front elevational view of another aspect of a handle and support according to the present invention;

FIG. 31 is a side elevational view of another mat and wipe stack usable on the handle and support of FIG. 30;

FIG. 32 is an exploded end elevational view showing the mounting of the mat and wipe stack of FIG. 31 on the support of FIG. 30;

DETAILED DESCRIPTION

Figure 1:
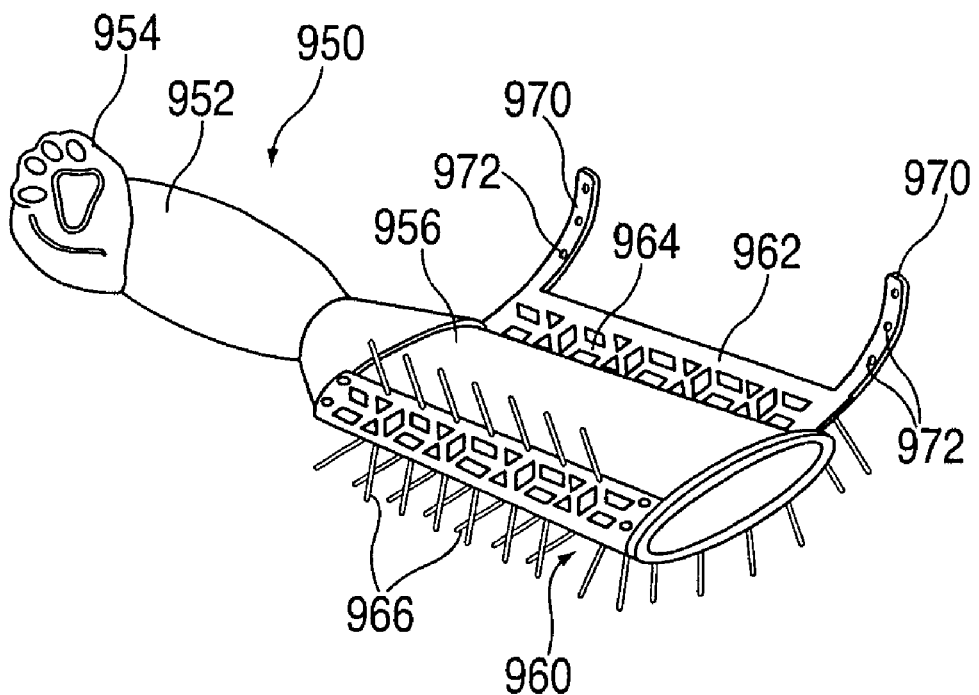
FIG. 1 is a perspective view showing one aspect of a cleaning element applied to a handle and support, with the cleaning element shown in a partially mounted position on the support.
Figure 2:
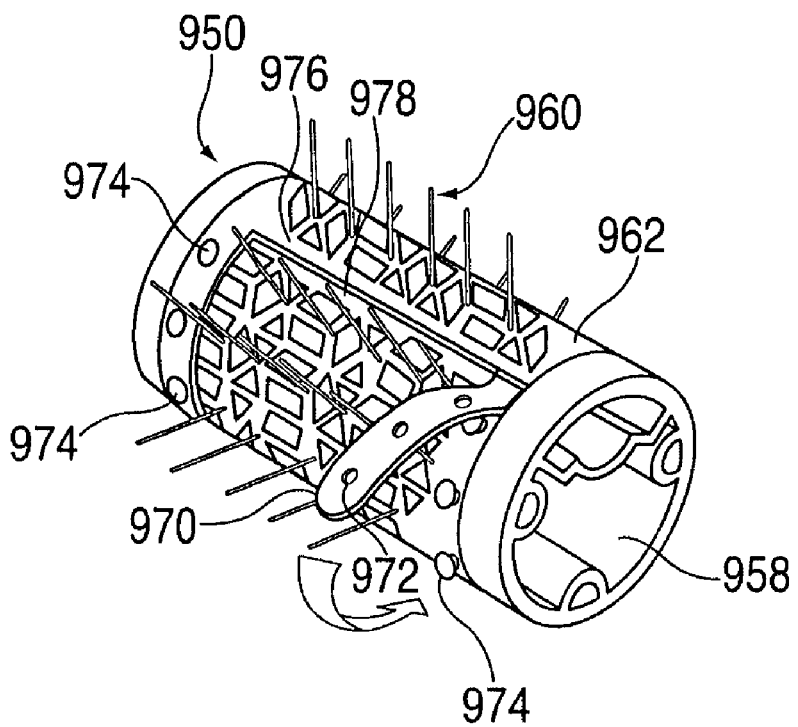
FIG. 2 is a perspective view of another aspect of a cleaning element according to the present invention, also depicted in a partially mounted state.

Referring now to FIGS. 1 and 2, there is depicted one aspect of a cleaning apparatus 950 according to the present invention. In this aspect, the cleaning apparatus 950 is a non-rotatable, generally one piece handle and support assembly including a handle 952, an end cap 954 and a cleaning element support 956.

A cleaning element 960 is formed, such as by molding, in an elongated, generally flat or planar shape. The cleaning element 960 includes a mat 962 of either solid or discontinuous shape which may have apertures 964 and angularly extending bristles 966. The bristles 966 may extend generally perpendicular from the mat 962 as shown in FIGS. 1 and 2.

The mat 962 is formed of a flexible plastic material so as to enable it to be disposed about a support 956 or 958 and removably secured in place for use.

In FIG. 1, since the support 956 on the cleaning apparatus 950 has a generally oval shape, the mat 962 will when mounted about the support 956 will conform to and assume an oval shape.

In FIG. 2, since the core or support 958 is circular in cross-section, the mat 960 will also assume a circular shape.

FIGS. 1 and 2 depict one means for securing the mat 962 to the core or support 956 or 958. As shown in FIGS. 43 and 44, the mat 962 includes at least one and preferably a pair of spaced straps 970 extending from one edge of the mat 962. The straps 970 include at least one and preferably a plurality of spaced apertures 972. The apertures 972 are adapted to snap over and engage generally mushroom shaped projections 974 extending from an edge portion of the mat. This secures the mat 962 about the support 956 or 958 with opposed edges 976 and 978 of the mat 962 juxtaposed or disposed in side-by-side registry. Alternately, the projections 974 could be formed in the straps and the apertures 972 formed in the mat.

It is also possible to form the apertures or projections directly in the core or support 956 or 958. In this arrangement, the corresponding or mating projections or elements are formed on the straps 970 of the mat 962 or in any portion of the mat 962 to allow easy and removable mounting of the mat 962 on the core support 956 or 958.

Figure 3:
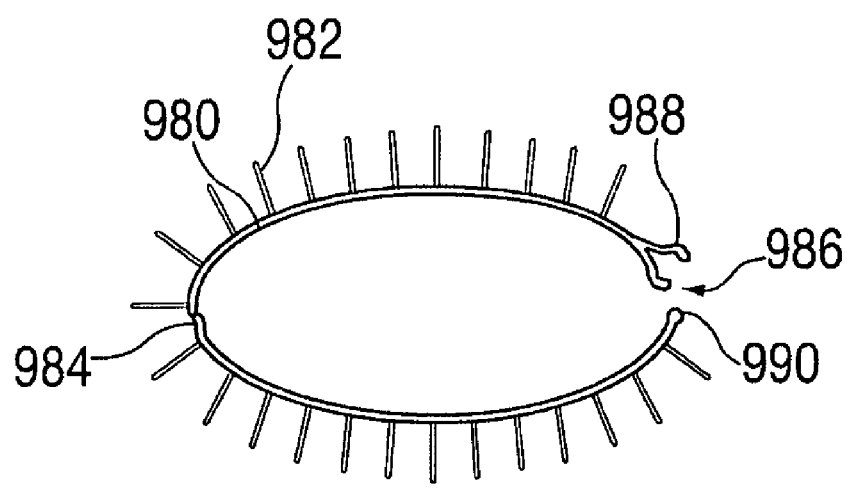
FIG. 3 is an end elevational view of another aspect of a lock means for the cleaning elements shown in FIGS. 1 and 2.

Another means for attaching a mat about a support is shown in FIG. 3. In this aspect of the invention, a mat 980 having a construction similar to the mat 974 has bristles 982 extending angularly therefrom. A reduced diameter portion or a living hinge 984 is formed longitudinally along one portion of the mat 980. The opposite free ends of the mat 980 are formed with a lock means 986 in the form of a receiver 988 and a projection 990 integrally carried on opposite free ends of the mat 980. The projection is releasably engagable in the receiver 988 to releasably secure the mat 980 about a support.

Figure 4:
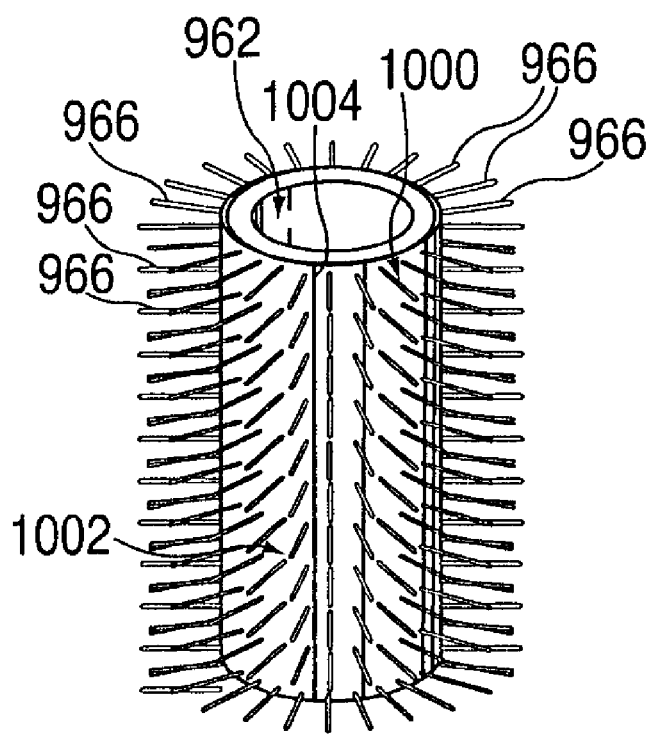
FIG. 4 is a perspective view of another aspect of a cleaning element according to the present invention using a pre-moistened sheet wrapped around bristles extending from a mat.

Referring now to FIG. 4, there is depicted yet another aspect of the present invention in which any one of the cleaning elements described above which has protruding bristles extending from a mat or pad may also carry a fabric sheet in the form of one or more stacked layers of either a separate pad-like stack or wound in a continuous roll about the mat. The sheet, also referred to as a wipe 1000, may be any fabric sheet, such as a spunlace fabric of 20 gsm to 150 gsm non-woven material. The sheet or wipe 1000 may be applied in a dry state for cleaning, polishing, etc., or pre-moistened with any suitable cleaning, conditioning, polishing, conditioning, deodorizing, freshening or medicament preparation or with a water activated, dry composition.

Due to the relatively loose fiber construction of the sheet or wipe 1000, the sheet or wipe may be forced under pressure over the bristles 966 in such a manner that the bristles 966 pierce and extend through the sheet 1000. Alternately, pre-punching apertures could be placed in the sheets 1000 arranged in the bristle pattern. After the desired wipe layer buildup is provided a smaller portion of the overall length of the bristles 966 will still extend outward from the outermost sheet 1000. The outermost edge 1004 of the sheet 1000 will normally be retained on the mat 962 due to the extension of the bristles 966 through the sheet 1000 and/or the non-parallel orientation of adjoining bristles 966.

In the case of bristles 966 formed of a rubber or elastomeric material, as compared to the smoother plastic materials employed for the bristles 966, the unique rubber or elastomeric composition of the bristles 966 uniquely combines with the wipe 1000 to provide an expedient means for collecting hair and other debris from a pet's coat as the bristles 966 are moved through the pet's coat and then removing the hair, fur or debris collected by the bristles 966 from the entire mat upon removal of the outermost sheet of the wipe from the core or handle assembly. In addition, where the wipe 1000 is in a pre-moistened state or provided with a tackified or adhesive outer surface, any debris, hair or fur collected by the bristles 966 is held in place by the wipe 1000. This provides a simple cleaning effort since any hair, fur or debris removed from the pet as the bristles 966 are removed through the pet's coat is collected and retained on the bristles 966 and/or the wipe 1000.

The mat 962, which has been formed in a circular or ovalid shape with the ends locked together, can be applied over the hand held cleaning apparatus. The mat 962 can also be formed in a flat shape and locked around an ovalid or semi-ovalid shaped handle.

In use, the cleaning element 1002 is urged over the surface to be cleaned, such as a pet's coat. The bristles detangle the fur or hair and the outermost surface of the wipe or sheet 1000 cleans or applies a conditioning, cleaning, deodorizing, freshening, medicament, etc., fluid to the pet's coat.

When the outermost sheet 1000 is soiled, the edge 1004 or an integral tab, not shown, extending from the edge 1004 is grabbed and pulled from the mat 962. This separates the outermost sheet 1000 from the bristles 966 until a fresh sheet 1000 is exposed. It should be noted that the act of removing the outermost sheet 1000 also pulls any hair or debris which may have been dislodged by the bristles 966 from the pet's coat away from the mat 962.

Continued grooming and subsequent removal of additional sheets 1000 from the mat 962 will expose more and more of the length of the bristles 966. This causes a deeper penetration of the bristles into the pet's coat for a deeper grooming or massaging effect as well as a more thorough cleaning of the pet's coat for the application of conditioning fluid to the pet's coat.

It will also be noted that a sheet, similar to sheet 1000, may be provided with the length to be applied in one or more separate stacked layers on the mat 980 shown in FIG. 3, with one end of the sheet extending from the receiver 988 to the opposite end disposed adjacent to the projection 990.

The various bristles or projections on the cleaning elements described above as well as the one piece handle and cleaning element support described above can be simply embodied in a one piece brush having a handle portion extending from a unitary cleaning element support from which a plurality of bristles are integrally formed or otherwise fixedly mounted on the support.

A sheet constructed as described above can be wound one or more times around at least a portion and preferably the entire circumference of the bristles. Depending upon the looseness of the fabric, the bristles can pierce and extend through the sheet. Alternately, as described above, apertures may be formed in the sheet to allow for passage of the bristles therethrough.

In this aspect, once the sheet or wound roll of sheets has been completely used, the entire brush can be discarded.

Referring now to FIGS. 5 and 6, there is depicted two aspects of protective cap or enclosure which can be used to surround a cleaning element of the present invention such as a pre-moistened sheet 1000 wound around the support section of the cleaning apparatus 1030.

In the aspect shown in FIG. 5, the protect cap or closure 1032 is formed as a cylinder having an ovalid or circular cross section with a closed end 1034 and an opposed open end 1036. A sidewall 1038 extends between the ends 1034 and 1036.

The inside diameter of the cap 1032 is sized to easily slide over the sheet 1000 and any bristles extending through the sheet 1000. The end 1040 of the cap 1032 adjacent the open end 1036 is sized to form a friction or pressure fit with a collar 1042 formed on the cleaning apparatus 1030 between a handle and the cleaning element support portions of the cleaning apparatus 1030. In this manner, the cap 1032 may be sealingly attached to the collar 1042 to sealingly enclose and prevent evaporation of the pre-applied fluid on the sheet 1000.

Another aspect of the a protective cap 1050 is depicted in FIG. 6. In this aspect, the protective cap 1050 include first and second complementary sections 1052 an 1054 which are hingedly connected, such as by a living hinge 1056 integrally formed between the sections 1052 and 1054.

The sections 1052 and 1054 have an ovalid or circular cross section so as to snugly enclose the sheet 1000 and any bristles extending through the sheet 1000 to sealing encompass the sheet 1000 and prevent evaporation of any fluid pre-applied to the sheet 1000.

Suitable lock means, not shown, may be carried on the sections 1052 and 1054 to enable the sections 1052 and 1054 to engage in a snap connection forming a seal about mating peripheral edges of the sections 1052 and 1054.

Figure 8:
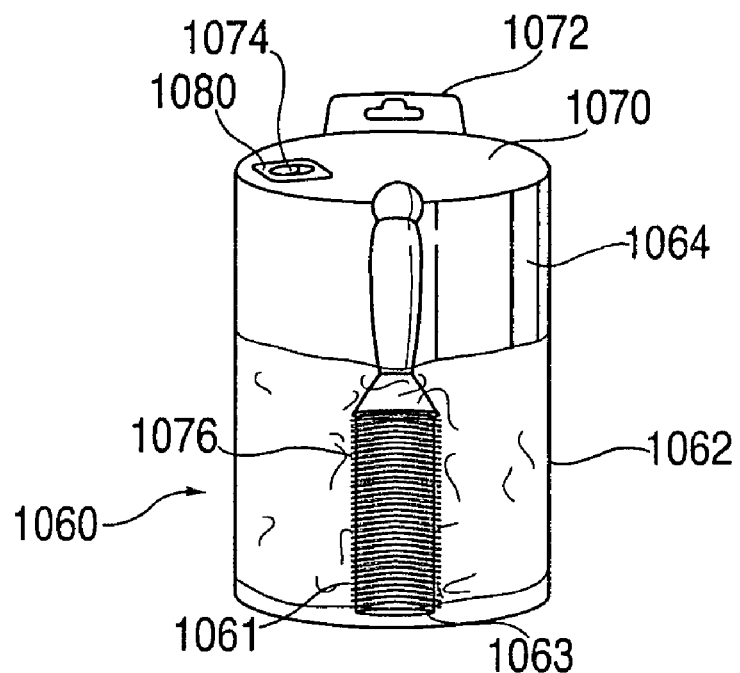

Referring now to FIGS. 7 and 8, there is depicted another container 1060 which may be used to store the cleaning element of the present invention during shipping from its initial manufacturing site to a final assembly site wherein the cleaning, deodorizing or medicament solution is added to the wipe, as well as providing a convenient container for sealingly enclosing the cleaning element between uses by the consumer while preventing evaporation of any fluid applied to the wipe on the cleaning element.

As shown in FIG. 7, the container 1060 includes, by example only, a two part container including a lower container 1062 and an upper container 1064 which are sealingly joinable by suitable means, including a pressure fit, a snap fit, sealing elements, threads, and combinations thereof.

The lower container 1062 is a closed ended container having an open top end 1066.

The upper container 1064 also has an open end 1068 adapted to fluidically communicate with the open end 1066 of the lower container 1062. The opposite end 1070 of the upper container 1064 is closed. A hanger 1072 may optionally be formed or mounted on the closed end 1070 of the upper container 1064 for ease of handling, mounting during display in a store, etc.

An aperture 1074 is formed in the upper container 1064 in either a side wall container or, optionally, in the end 1070. The aperture 1074 provides an easy means for applying fluid 1076, in FIG. 8, into the interior of the container 1060.

A moisture proof, seal member 1080, such as a rubber stopper plastic threaded cap or an adhesive backed tape or label, is removably or permanently applied over the aperture 1074 after the fluid 1076 is poured into the container 1060.

In use, once the cleaning element 1061 having a wipe according to one of the aspects of the invention described above is assembled, it is placed within the lower container 1062. The upper container 1064 is then sealingly joined to the lower container 1062. It should be noted in this state, the wipes 1063 on the cleaning element 1061 are dry. The sealed container 1060 can then be shipped to a final assembly site. The sealable cover 1080 is removed exposing the aperture 1074. The desired solution, i.e., cleaning, deodorizing, medicament, etc., is then poured through the aperture 1062 into the interior of the container 1060 wherein it is absorbed by the wipe 1063. The cover 1080 is then sealingly applied over the aperture 1070 to seal the interior of the container 1060. Alternately, the container is shipped to plant without the seal 1080 and unclosed. It is then filled and the closing means installed.

Only enough liquid is poured through the aperture 1074 to be absorbed by the wipes 1063.

Once the now complete cleaning assembly has been purchased by a consumer, in order to use the cleaning apparatus 1061, the consumer separates the upper container 1064 from the lower container 1062 and removes the cleaning apparatus 1061. After use has been completed, the consumer reinserts the cleaning apparatus 1061 into the lower container 1062 and sealingly attaches the upper container 1064. This forms a closed environment for the cleaning element 1061 to prevent evaporation of the fluid applied to the wipe 1063.

Refill wipe cartridges, as described above, may be subsequently purchased by the consumer. The replacement cartridges can be removed from the sealable enclosure, such as a flexible, sealable pouch or container, and mounted on the cleaning apparatus 1061 as a replacement for a used cleaning element and wipe 1063. The refilled cleaning apparatus 1061 is then reinserted into the container 1060.

Figure 9:
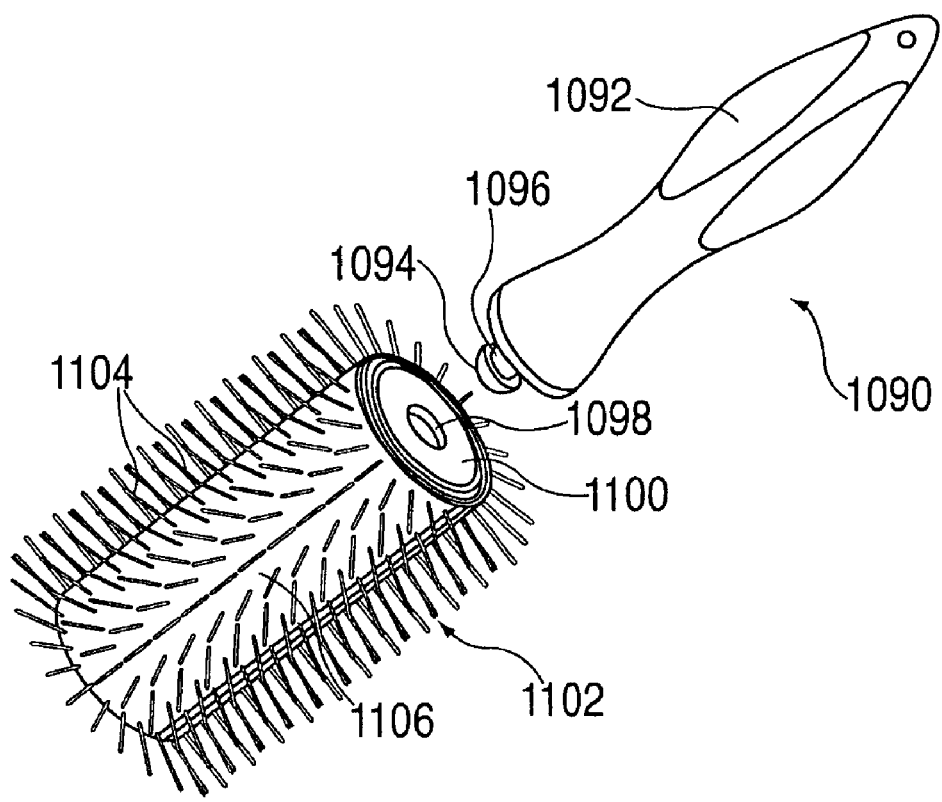
FIG. 9 is a perspective view of another aspect of the present invention.
Figure 20:
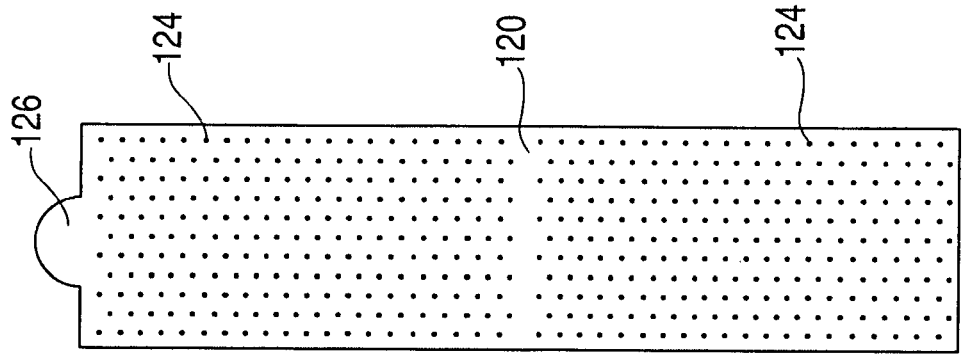
FIG. 20 is a plan, expanded view of one of the wipes shown in FIG. 19.

Referring now to FIG. 9, there is depicted yet another aspect of a cleaning apparatus 1090 according to the present invention. In this aspect, the cleaning apparatus 1090 includes a handle 1092 of any suitable shape. The handle 1092 may be hollow or solid. One end of the handle 1092 is formed with one part of a locking means, such as a mushroom shaped, enlarged cap or head 1094. The head 1094 extends from a smaller diameter neck 1096 which integrally extends from one end of the handle 1092. The head 1094 is adapted to snap into and lock through an aperture 1098 in an end wall 1100 of cleaning element denoted generally by reference number 1102. The end wall 1100 may be a part of a generally tubular support or core having a circular or ovalid cross-section. The aperture 1098 has a slightly smaller diameter than the outer diameter of the head 1094 to allow the head 1094 to be deformably inserted through the aperture 1098 and then expand outward to its normal shape. This positions the neck 1096 in the aperture 1098.

The diameter of the aperture 1098 and the outer diameter of the neck 1096 may be complementarity sized for fixed or rotative movement between the handle 1092 and the cleaning element 1102.

By way of example only, the cleaning element 1102 is depicted as having a plurality of outwardly extending bristles or projections 1104 and a cleaning sheet 1106, such as a non-woven fabric, as described above. The sheet 1106 may be provided in a single layer or in a plurality of layers about at least a portion and preferably the entire periphery of the core 1100. The sheet 1106, when wound into a plurality of turns about the core 1100, may be provided with separable individual sheets, as described above.

Referring now to FIGS. 10-14, there is disclosed the cleaning apparatus 950, described above and shown in FIGS. 1 and 2, which has a modified cleaning element 100.

In this aspect, the cleaning apparatus 950 includes the handle 952, the end cap 954, and the cleaning element support 956. A shoulder 957 is formed between a transition portion of the support 956 and the handle 952 and forms an edge for locating one end of the cleaning element 100 when the cleaning element 100 is mounted on the support 956. The opposite end of the support 956 is formed with a plurality of resilient fingers 958 which project radially outward from the plane of the support 956. The fingers 958 are bendable radially inward to allow sliding mounting of the cleaning element 100 over the support 956. Once the outermost end of the cleaning element 100 passes the fingers 958, the fingers 958 snap back to their original position to retain the cleaning element 100 on the support 956.

The cleaning element 100 includes a substrate mat 102 formed of a flexible plastic material. This enables the mat 102 to be bent or conformed to the shape of the support 956 which is depicted in FIGS. 10 and 14 as being oval, by example only. Other shapes, such as circular, may also be employed for the support 956. As shown in FIGS. 12 and 13, the mat 102 is initially molded in a flat or planar configuration. Although the mat 102 may have a solid structure, by example only and for reduced material usage, and reduced weight, the mat 102 is formed with a solid peripheral boarder 104 extending between a first end 106 and an opposed second end 108. Apertures 110 and projections 112 are formed in the peripheral edge 104 of the mat 102 adjacent the first and second ends 106 and 108, respectively. Any number of apertures 110 and projections 112 may be employed. As shown in FIGS. 13 and 14, the second end 108 of the mat 102 has a notch or offset portion 114 which allows overlap of the opposed first end 106 when the mat 102 is bent to the shape of the support 956. For example, the first end 106 when formed to seat in the offset portion 114, provides a constant diameter inner surface in the mat 102 for conforming the mat 102, when in the shape shown in FIGS. 10 and 14, on the support 956.

By example only, the outermost end 106 of the mat 102 is preferably located at one of the sides or apexes of the oval shape, folded mat 102 shown in FIG. 14.

The interior of the mat 102 within the peripheral edge 104 is, by example only, formed with a lattice network 105 of short length segments for structural integrity.

In use, the mat 102 is initially formed in the generally planar shape shown in FIG. 13. A plurality of outwardly extending projections or bristles 116 are integrally formed on the mat, both in the peripheral edge 104 and at intersection points of the segments in the lattice network 105. The bristles 116 provide a grooming action when the cleaning apparatus is moved through hair or fur.

Although the mat 102 may be used by itself for pet grooming purposes, an enhanced cleaning action as well as the ability to apply medication, grooming or cleaning solutions, etc., may be achieved by providing one or more sheets or wipes 120 arranged in a separable stack as shown in FIGS. 11 and 13. Each wipe 120 of a fabric sheet, such as a spunlace fabric of 20 gsm to 150 gsm non-woven material is in the form of a fabric or paper sheet which may be dry or pre-moistened with a cleaning composition, such as a cleaning fluid, medication for pet allergies, etc., flea or tick medication, deodorizing compositions, etc.

The fabric or cleaning wipe 120 is water insoluble. This means that the fabric does not dissolve in or readily break apart upon immersion in water.

Suitable materials for forming the wipe 120 include non-woven substrates, woven substrates, natural or synthetic sponges, polymeric nets or meshes, etc.

In one aspect, the wipe 120 is formed of a non-woven substrate in which one or more layers are formed of fibers which are not woven into a fabric, but are formed into a sheet, mat or layer. The fibers can be randomly aligned or oriented in primarily one direction. The non-woven substrate can also be formed of a combination of layers of random and directionally oriented fibers.

Non-woven wipe 120 can be formed of a variety of materials. Natural materials include silk fibers, cellulose fibers, wool fibers, camel hair fibers and the like. Cellulose fibers include fiber selected from wood pulp, cotton, hemp, jute, flax, in mixtures thereof.

Synthetic materials which can be used to form a non-woven wipe include any fiber selected from the group consisting of acetate, acrylic, cellulose, ester, polyamide, polyester, polyolefin, polyvinyl alcohol, polyurethane foam, in mixtures thereof.

Further, the water insoluble substrates used to form the wipe 120 may also be formed of two or more layers, each having different capabilities. The different capabilities can result from the use of different combinations of materials or from the use of different manufacturing processes or a combination thereof.

Alternately, the wipe 120 may be formed of a fabric sheet such as a spun lace. The wipe 120 may be applied in a dry state for cleaning, polishing, etc., or pre-moistened with any suitable cleaning, conditioning, polishing, deodorizing, or medicament preparation or with a water activated dry composition.

The wipes 120 may also be provided in a continuous wound roll about the mat 102 with perforations or other separation means formed between individual sheets to enable the outermost sheet to be peeled off of the roll when soiled in the same manner as lint rollers.

As shown by example only in FIG. 11, each sheet 120 has an overall shape approximate that of the mat 102. Small apertures 122 may be formed throughout the loosely woven sheet 120. Although the bristles 116 may be forced through the loosely woven sheet 120, a plurality of larger diameter apertures 124 may be formed in each sheet 120 in a configuration matching the configuration of the bristles 116 on the mat 102. This enables each sheet 120 or a stack of like sheets 120 to be inserted over the bristles 116 as shown in FIG. 14, with the outer ends of the bristles 116 projecting outward beyond the topmost sheet 120.

Pull tabs 126 are formed at the end of each sheet 120 to allow for easy separation of a soiled or dirty outermost sheet 120 from the stack of sheets 120 on the mat 102. During this removal step, the outermost sheet 120 will also remove any hair or pet fur entwined about the bristles 116 thereby presenting a clean sheet 120 and bristles 116 free of hair, fur and other debris.

In use, the stack of a plurality of sheets 120 is mounted over the bristles 116 on a flat configured mat 102 as shown in FIG. 13. This loading step is simplified since the bristles 116 extend generally perpendicular from the mat 102 when the mat 102 is laid out in a flat configuration.

Next, the mat 102 and joined sheets 120 are folded or wrapped into a shape consistent with the shape of the support 956. By example only, the mat 102 is formed into an oval shape as shown in FIGS. 10 and 14. The apertures 110 are inserted over the projections 112 on opposite ends 106 and 108 of the mat 102 to lock the mat 102 in the oval shape. The entire cleaning element 100 formed of the sheets 120 mounted on the mat 102 is then forced over the fingers 958 on the support 956 as shown in FIG. 10. The cleaning apparatus 950 may then be used by pushing or pulling the cleaning element 100 through human hair or animal fur.

It will also be understood that the above-described mat 102 in a flattened shape or in the pre-wrapped or folded oval shape shown by way of example in FIG. 14 with or without the wipes 120 may be sold as a refill cartridge for an existing handle and support 950.

The mat 102 may be sold as a refill cartridge itself in either a pre-wrapped or oval shape or the flattened shape which will then be formed by the consumer into the desired shapes complementary to the shape of the support 956. Alternately, the entire wrapped or bent mat 102 and a stack of wipes 120 may be sold as a complete unit. In this refill configuration, the wipes 120 may be provided in a dry state and subsequently subjected to a cleaning, deodorizing or medicament solution as describe hereafter. Alternately, all of the wipes 120 may be pre-moistened with the desired solution.

When the mat 102 is folded into the oval shape shown in FIG. 14, certain of the bristles 116 assume a non-perpendicular, angular position, with respect to the mat 102 and axis extending through the apexes of the oval shaped mat 102. This aids in holding the wipes 120 on the mat 102.

Referring back to FIG. 10, apertures 130 may be formed in the support 956 to allow dripping or oozing of cleaning fluid into the stack of sheets or wipes 120 carried on the mat 102 mounted on the support 156 when the hollow center portion of the support 156 is filed with liquid during the liquid filling stage of the production process.

Referring now to FIGS. 15-17, there is depicted a modification to the cleaning apparatus 950 in which the transition portion between the handle 952 and the support 956 is formed as a radially enlarged collar 140 having an open end and an interior recess within the collar 140.

The collar 140 is configured for mounting, via a snap-on, fluid-tight releasable mount on a recessed shoulder 142 of a container 144. The container 144 may be used to contain cleaning or medicament fluid for application to dry wipes 120 on the apparatus 130. The wipes 120 on the mat 102 mounted on the support 956 can be inserted into the interior of the container 144 shown in FIG. 16 until the collar 140 snaps over the shoulder 142. This seals the container and enables fluid within the container 144 to diffuse into the wipes 120. The apertures 130 formed in the support 956 allow for fluid passage from the interior of the hollow support 956, through the mat 102 and into the wipes 120.

Turning now to FIGS. 18-24, there is depicted another aspect of a cleaning apparatus denoted generally by reference number 150 in the complete assembly shown in FIGS. 23 and 24.

The cleaning apparatus 150 includes a two-part injection molded handle 152 formed of substantially identical, mating handle sections 154 and 156. Projections 158 on one of the handle sections, such as handle section 154 snap into or are heat or sonic welded to mating apertures or sections in the opposed handle section 156 to integrally join the handle sections 154 and 156 to form the completed handle 152. The handle 152 has a generally ergonomically shaped hand engagable end 158 and a bristle/wipe support 160 extending therefrom. The support 160 has a generally wedge or tapered shape extending from a larger outer diameter end 162 adjacent the handle 158 to a substantially pointed apex 164 at an opposite end.

An aperture 159 in the handle 152 which may be used to receive a hanger to support the cleaning apparatus 152 during initial sale or between uses. As seen in a transverse view shown in FIG. 22, the support section 160 has a generally polygonal or rectangular shape.

Figure 19:
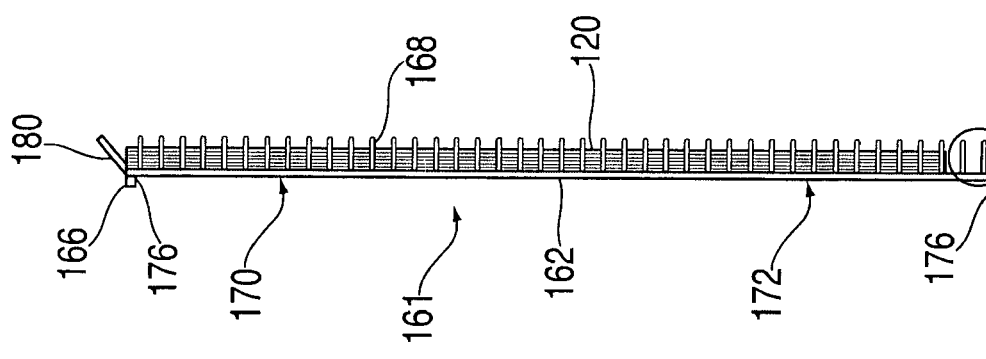
FIG. 19 is a side elevational view of the mat shown in FIG. 17 carrying a stack of wipes.
Figure 18:
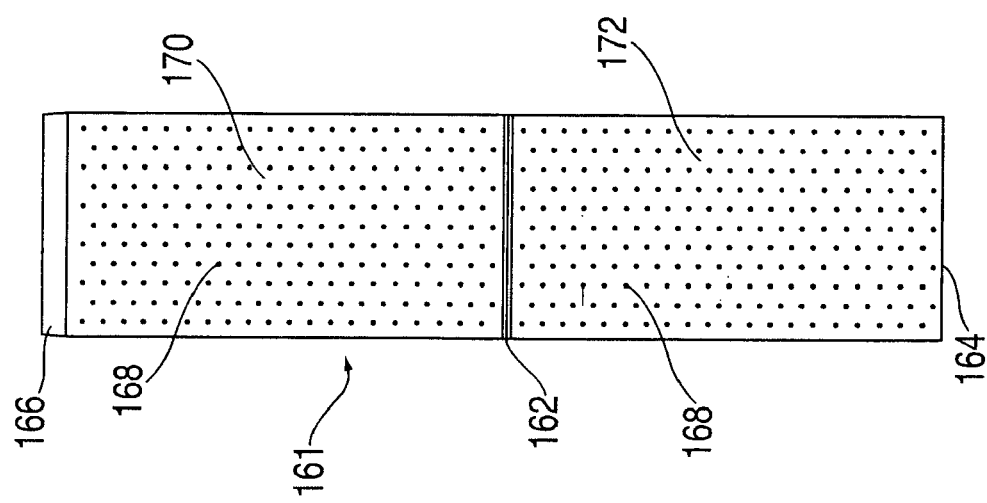
FIG. 18 is a plan view of another aspect of a mat according to the present invention depicted in a pre-assembled, expanded flat state.

A mat 161, shown in FIGS. 18 and 19, has a polygonal configuration complementary to the shape of the joined support sections 160 of the handle 152. The mat 161 is formed of a molded plastic material and has a thinned or hinged section 162 formed intermediate opposed ends 164 and 166. A plurality of bristles 168 are formed on each of the two sections 170 and 172 of the mat 161.

Although the mat 161 may be employed by itself for grooming, wipes 120, as described above, may be mounted over the bristles 168 to apply a cleaning, polishing or medicament solution.

Each wipe 120, as described in detail above and shown in FIG. 11, includes a plurality of large diameter apertures 124 which are arranged in the same two dimensional pattern as the bristles 168 on the mat 161. This enables one or more wipes 120 to be applied over the bristles 168 and retained thereon. One end of each wipe 120 includes a pull tab 126 for removing an outermost wipe from a stack of wipes mounted on the mat 161.

Mounting apertures 174 are formed in the larger diameter end 162 of the support 160, and are provided on opposite sides of the support 160. The apertures 174 receive lock projections 176 formed at opposite ends of the mat 161 to releasably mount the mat 161 on the support 160.

An optional angled lip 180 may be formed at the end 166 of the mat 161. The lip 180 extends angularly from the adjacent planar portion of the mat 161 to bend the pull tabs 124 on the stack of wipes 120 outward to a more easily grasped position.

In assembling the cleaning apparatus 150, the wipes 120 are inserted over the bristles 168 of the mat 161. The mat 161 is then bent into the angular configuration shown in FIG. 23 about the hinge 162 and is urged over the support 160 of the handle assembly 150 until the projections 176 can be lockably inserted into the apertures 174 on the support 160. The completely assembled cleaning apparatus 150 is shown in FIG. 24.

A modified cleaning apparatus 190 is shown in FIGS. 25-29. The cleaning apparatus 190 includes a handle/support member 192 having a handle section 194 and a cleaning element support section 196.

Although the handle/support assembly 192 may be formed of the two joinable sections, as shown in FIG. 21, in this aspect of the cleaning apparatus of the present invention, the handle/support assembly 192 is formed as a one-piece, blow molded handle 194 and support 196 as shown in FIGS. 26-29.

Figure 27:
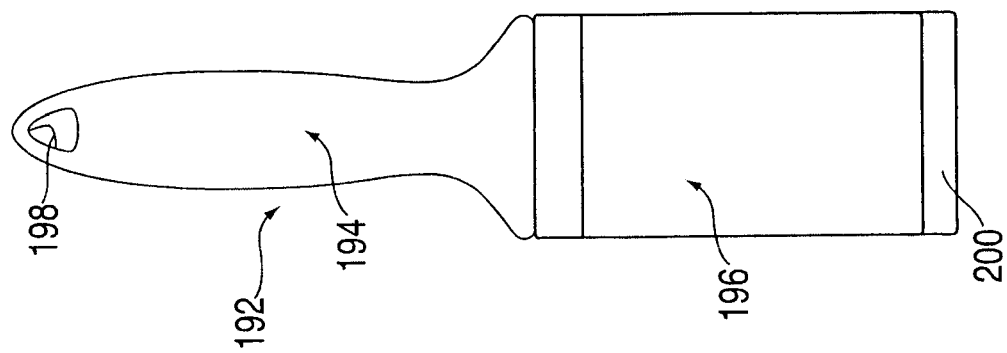
FIG. 27 is a front elevational view of the handle and support shown in FIG. 26.
Figure 26:
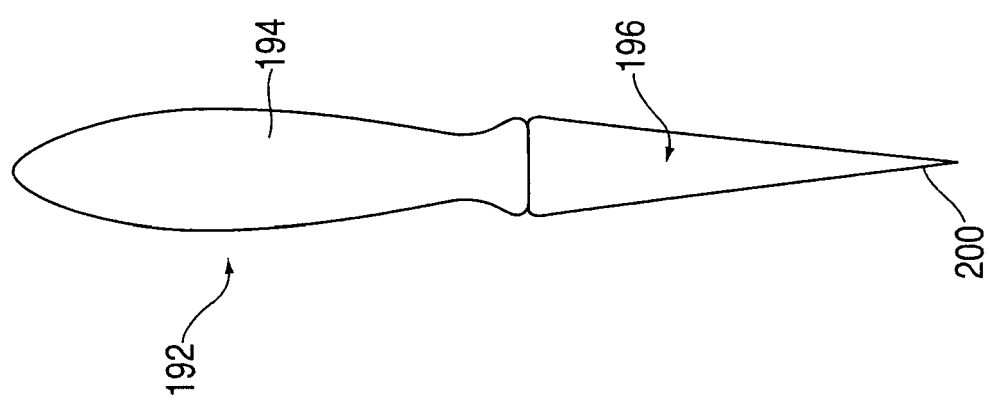
FIG. 26 is a side elevational view of an alternate handle and support according to the present invention.
Figure 25:
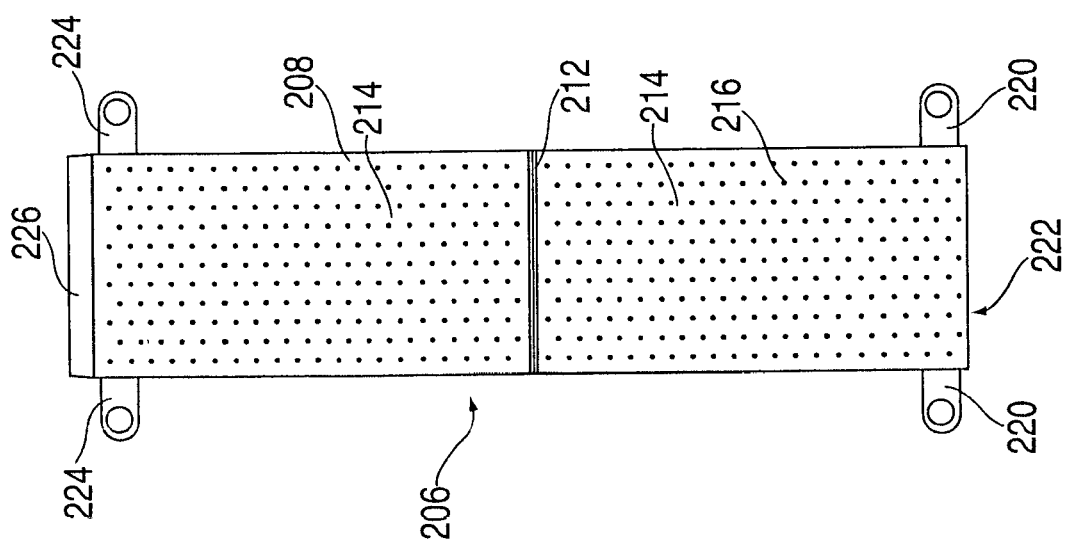
FIG. 25 is a plan, expanded view of an alternate mat according to another aspect of the present invention.
Figure 29:
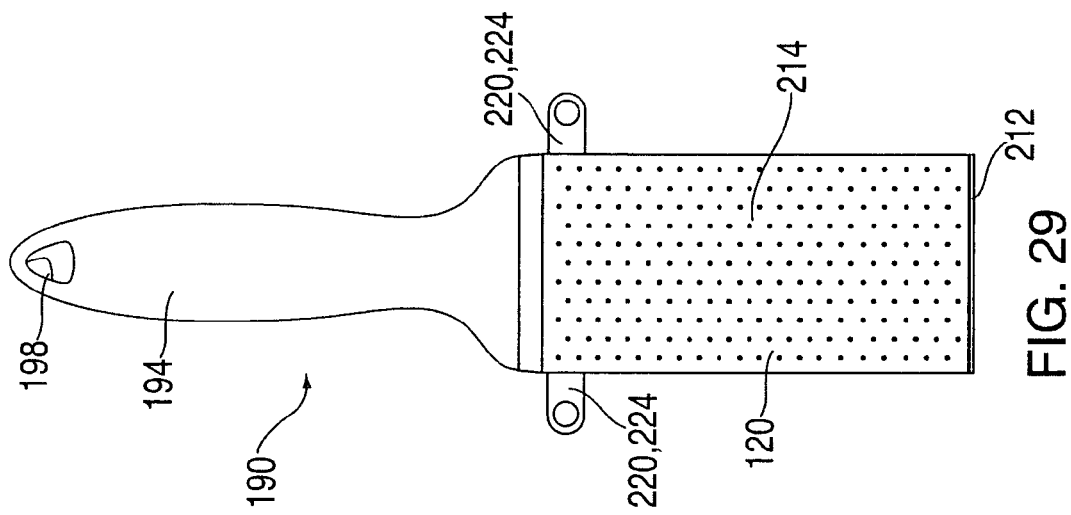
FIG. 29 is front elevational view of the assembled mat, wipes and handle/support of FIGS. 25-28.

The handle 194 is formed in an ergonomic hand configuration and may have a mounting or hanging aperture 198 at one end. The support section 196 transitions from the handle section 194 and has, by example only, a tapered cross section terminating in a point or apex 200. The lateral shape of the support 196 is generally polygonal or rectangular as shown in FIG. 27.

A mat 206 is substantially identical to the mat 161 and includes mat sections 208 and 210 separated by a narrowed down or thin hinge section 212. Bristles 214 are integrally formed in and extend outward from each mat section 208 and 210.

Instead of mating projections 176 and apertures 174 to lock the folded mat 206 on the support, in this aspect, the mat 206 is formed with mating snap tabs 220 at a first end 222 of the mat 206 and 224 at an opposite or second end 226 of the mat 206. The lock portions 220 and 224 may include conventional snaps as well as mating projections and apertures.

Figure 28:
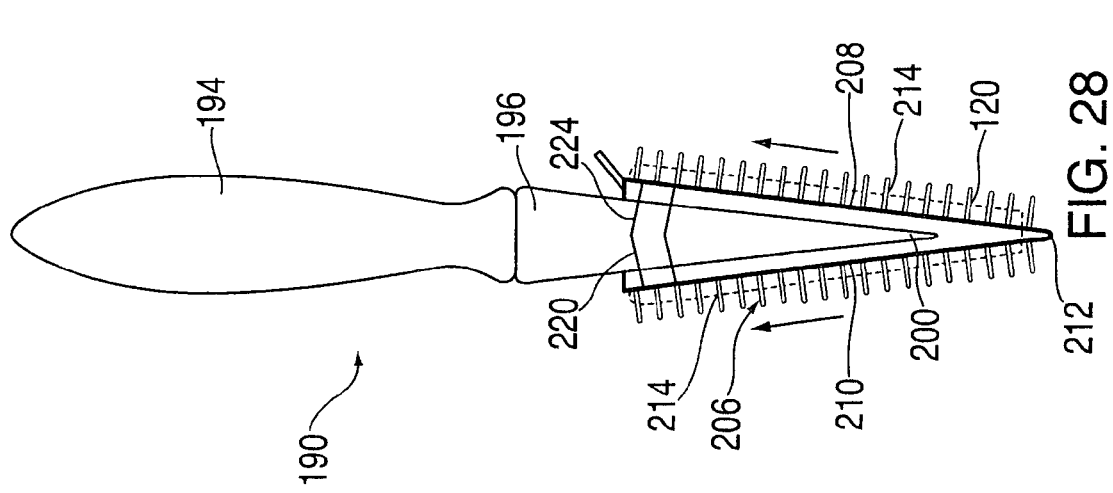
FIG. 28 is a partially exploded view showing the assembly of the mat of FIG. 25 on the handle and support of FIGS. 26 and 27.

As shown in FIG. 28, the mat 206, when in an elongated, flattened state, loaded with wipes 120 as described above and shown in FIG. 19, is folded about the hinge 212 into the angular, wedge shape shown in FIG. 28 and inserted about the spaced ends 222 and 226 over the support 196 until the hinge 212 substantially abuts the apex 200 on the support 196. In this position, the lock members 220 and 224 are engaged to releasably lock the mat 206 on the support 196.

Referring now to FIGS. 30-32, there is depicted yet another aspect of the present cleaning apparatus which includes a handle/support assembly 230. The assembly 230 may be formed of a one-piece blow molded member or two mating pieces which are snapped or welded together as described above and shown in FIG. 21. Regardless of the actual one or two piece construction which is employed, the assembly 230 includes a handle portion with a mounting or hanging aperture 236 and an integral support portion 234 shaped and sized to receive a cleaning element 240. A plurality of mounting apertures 238 are formed at spaced locations at one surface of the support 234 as shown in FIGS. 30 and 32 for receiving mating projections 242 on a mat or carrier 244.

The support 234 may have any cross sectional shape, such as the oval shape shown by example in FIG. 32 or a circular cross sectional shape, not shown.

The mat or carrier 244 has a generally planar initial configuration and is formed of a flexible material to enable it to conform to the outer surface of the support 234. The projections 242 are formed at spaced locations in an orientation complementary to the shape and position of the apertures 238 and the support 234 to enable the mat 244 to be releasably mounted on the support 234.

When in a generally flat, planar shape as shown in FIG. 31, one or a plurality of stacked wipes or sheets 120, each containing mounting apertures, by example only, are mounted over bristles 246 extending generally perpendicular from the main portion of the mat 244. The outer ends of the bristles 246 project exteriorly of the outermost sheet of the stack of sheets 120. However, when the mat 244 is conformed to the curved shape of the support 234, as shown in FIG. 32, certain of the bristles 246 will project non-perpendicularly angularly from bristles in the central portion of the mat 244 to assist in locking the sheets 120 on the mat 244.

The mat 244 carrying the wipes 120 is then mounted on the support 244 by engagement of the projection 242 and the apertures 238.

As described above, a pull tab 126 may be formed along one edges of the wipes 120 to enable easy removal of the outermost wipe 120 from the stack of wipes 120 so as to expose a clean wipe 120 as well as to remove any hair or debris entwined on the bristles 246.

Figure 33:
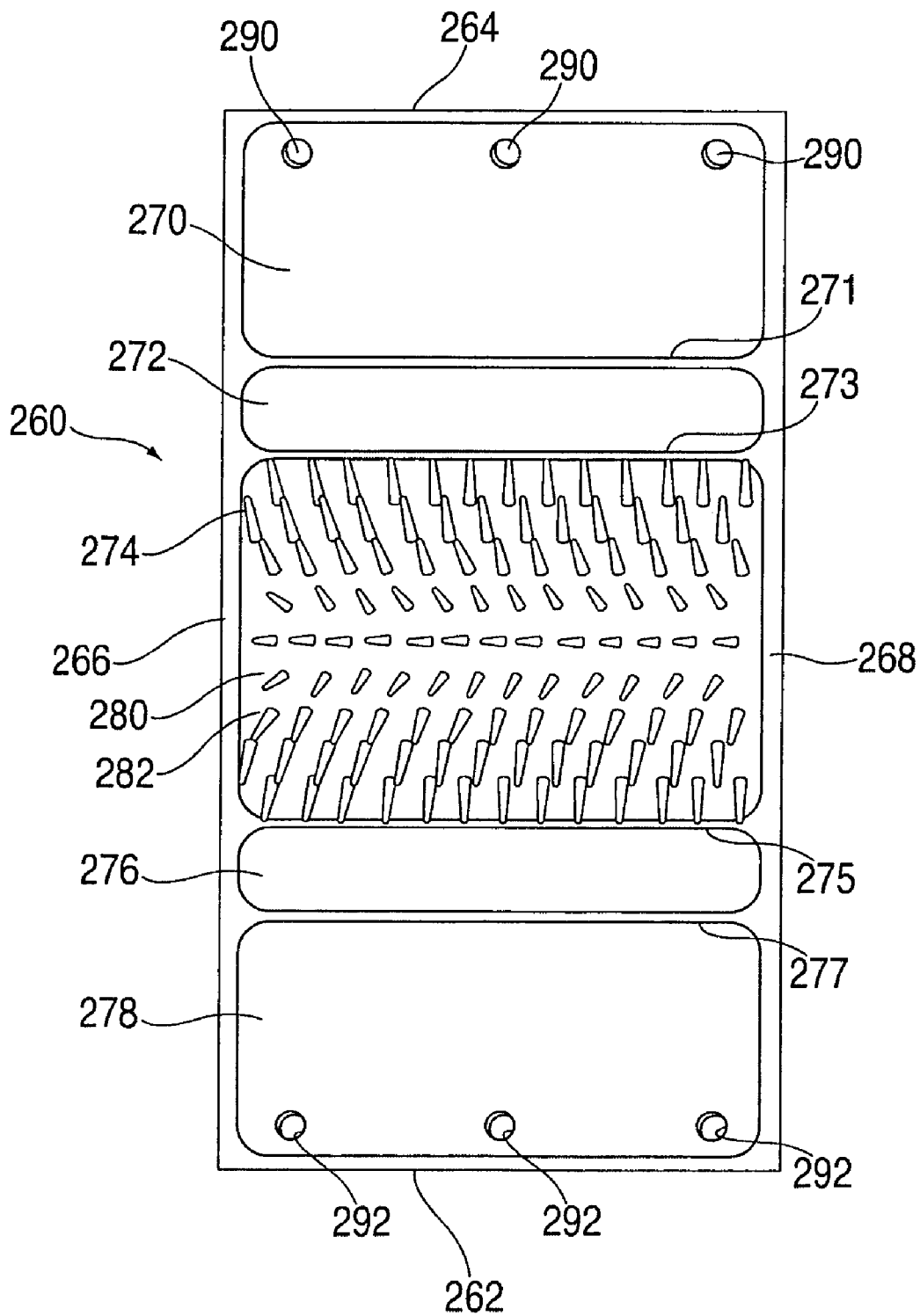
FIG. 33 is a plan view of another mat according to the present invention depicted in a pre-assembled, expanded, flat state.
Figure 37:
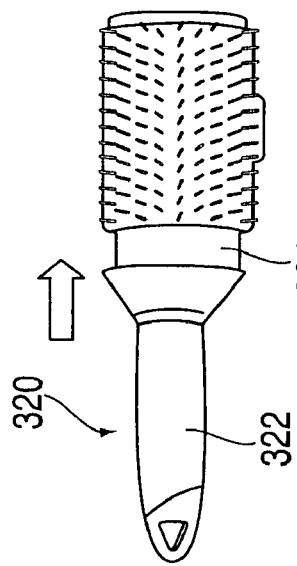
FIG. 37 is a partially expanded, side elevational view showing the use of the carrier, wipe and mats of any of FIGS. 33-36 with an optional handle and support.

Another aspect of a cleaning apparatus according to the present invention is shown in FIGS. 33-37. In this aspect, as shown in FIG. 33, a flat mat 260 formed of a flexible, molded plastic material, for example only, is formed with a particular shape, such as the illustrated polygonal or rectangular shape shown by way of example. The mat 260 has first and second side ends 262 and 264, respectively, and intervening, spaced longer edges 266 and 268. The mat 260 is formed with a plurality of sections including a first section 270, an adjacent second section 272, a third section 274, a forth section 276, and a fifth section 278. Each of the sections 270-278 is foldably or hingedly connected to an adjacent section by a thinned down or living hinge section 271, 273, 275, and 277, respectively. This enables the mat 260, after having been loaded with one or more wipes 280 arranged in a stack and disposed over bristles 282 integrally formed with an projecting outward from the third section 266, to be folded about the hinges 271, 273, 275 and 277 to bring the ends 262 and 264 into close proximity or an overlapped configuration with each other.

Figure 36:
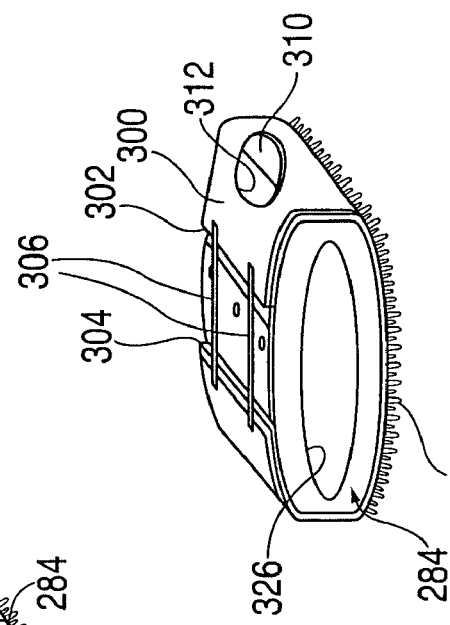
FIG. 36 is a perspective view showing one aspect of mounting a stack of wipes about the mat and carrier of FIG. 35.
Figure 35:
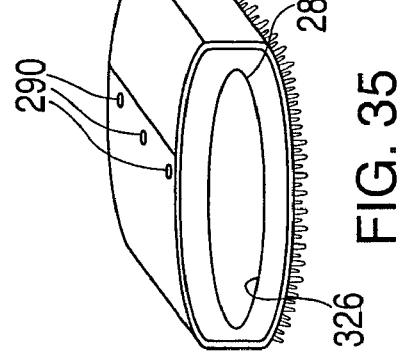
FIG. 35 is a perspective view of the assembled mat of FIG. 33 and the carrier of FIG. 34 and showing one aspect of mat locking means.
Figure 34:
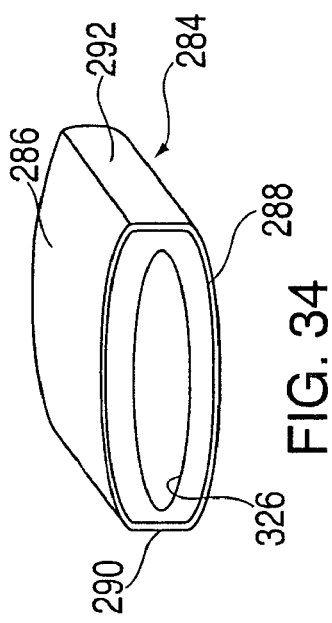
FIG. 34 is a perspective view of a carrier for the mat shown in FIG. 33.

A carrier, in the form of a block or pad 284, as shown in FIGS. 34-36, is formed with a circular or oval configuration, by example. In the oval configuration which is illustrated by way of example only, the block 284 has opposed major surfaces 286 and 288 and intervening, opposed side edges 290 and 292. In use, the mat 260 is applied with at least the third section 266 carrying the bristles 282 and disposed over the first major surface 286 carrying the wipe stack. The remaining sections are folded about the side edges 290 and 292 and the opposed major surface 288 of the block 284. In the case of overlapping ends 262 and 264, the ends 262 and 264 may be joined together in a snap fit formed by mating projections 290 which releasably engage apertures 292 in the opposite end of the mat 260 to releasably lock the entire mat 260 on the carrier 284.

In the aspect of the invention shown in FIGS. 33-35, the wipes 280 may have a shape covering only the third section 266 of the mat 260.

Alternately, as shown in FIG. 36, a stack of wipes 300 may have a longer length so as to wrap around the side edges 290 and 292 of the carrier 284 and at least partially over the opposed major surface 288 of the carrier 284.

The spaced ends 302 and 304 of the stack of wipes 300 can be releasably fixed on the carrier 284 by staples 306, for example only, which pierce the opposed ends 302 and 304 of the wipes 300. Pull tabs 310 are cut from each wipe 300 and extend outward from an aperture 312 formed in each wipe 300 by the formation of the tabs 310. Grasping and pulling the tab 310 of the outermost wipe 300 enables the outmost wipe 300 to be removed from the carrier 284 to expose a clean wipe 300.

Finally, an optional handle/support assembly 320 including a handle portion 322 and a cleaning element support section 324, as substantially shown in FIG. 10 and described above, may be provided for use of the carrier 284 and the wipes 300 described in any of the aspects of the invention shown in FIGS. 33-36. In this aspect, the support 324 has an outer shape to enable it to be inserted through a bore 326 formed in the carrier 284.

In applications where the handle 320 is not to be employed, the carrier 284 may be in the form of a solid body, without the bore 326. For lightweight, the carrier 284 may be formed of foam, such as STYROFOAM, polystryene or other suitable plastic. A decorative label may be removably mounted by adhesive, etc., over the wipes 300.

It will be understood that according to another aspect of the present invention, any of the completed substrates described above and shown in FIGS. 1-36 may be constructed as a refill for an existing handle and support, such as handle and support 950, 192, 230 or 284. The mats or substrates, with or without wipes, such as mats 960, 962, 100, 206, 244, and 260, may be packaged and sold as a refill cartridge in a expanded, flat state as shown in FIGS. 12, 13, 18, 25, and 33 or bent into the use position, such as the oval or circular cross section mat shown in FIGS. 1 and 2, by example only, with the opposed ends of the mats locked into the desired shape.

In addition, the wipes 120 on the substrates constructed as refill cartridges, may be provided in a dry or pre-moistened state pre-mounted or separate from the mat. If dry, any of the fluids or mediums described above, can be provided in a separate enclosure or container and applied by the user to the wipes prior to use. Alternately, one of the fluid containers described above and shown in FIGS. 6, 7, 8, and 15-17, may be employed to apply or reapply fluid to the wipes.

Figure 38:
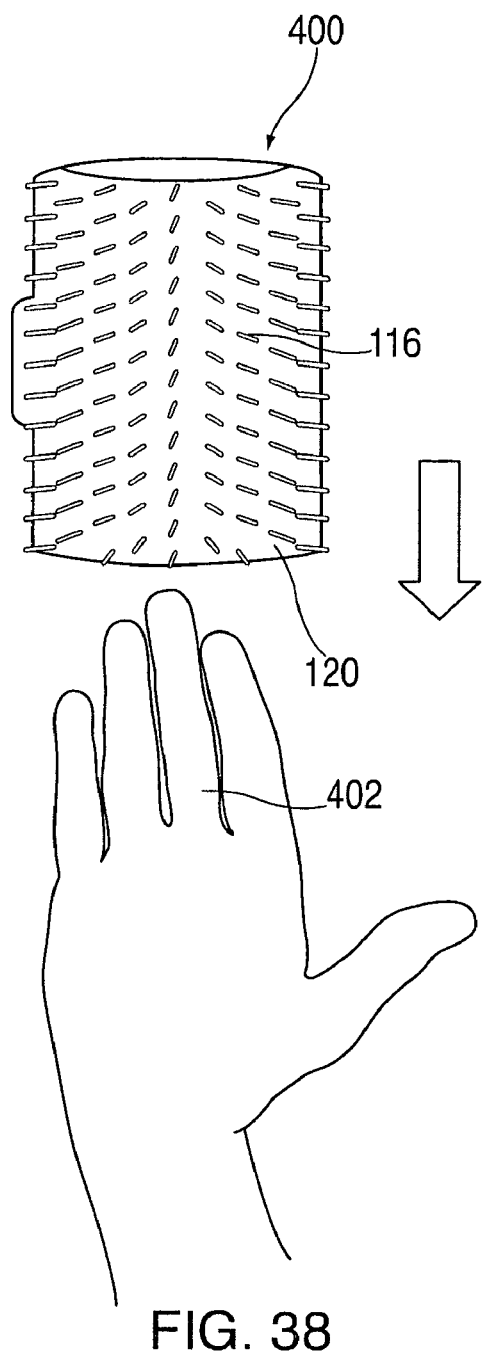
FIG. 38 is an exploded, partial perspective view showing another aspect of a mat according to the present invention.
Figure 39:
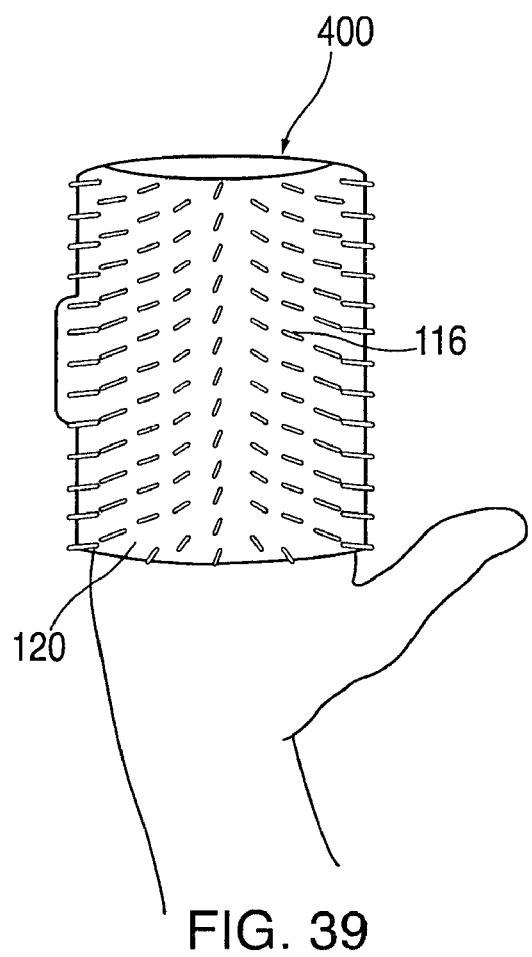
FIG. 39 is an elevational view showing the mat of FIG. 38 mounted on a user's fingers.

Referring now to FIGS. 38 and 39, there is depicted the use of a substrate or mat 400 constructed in the same manner as one of the substrates 960, 100, etc., described above for use without a support or handle by mounting the substrate carrying the wipes 120 mounted over bristles or tines 116, over a user's hand or one or more fingers 402. The diameter of the substrate 400 after the ends are joined together may be sized to receive any number of user fingers 402, such as four shown in FIGS. 38 and 39 by example only. Any of the substrates described above, such as substrate or mat 960, 100, etc., may also be employed as a hand mounted cleaning element although a lesser number of fingers, such as only two may be inserted into the bore extending through the mat 400.

The bristles 116 and the associated wipes 120 may be applied to one surface of the mat 400 or both opposed surfaces in the case of an oval, circular, elliptical, or a polygonal shaped mat 400.

The mat 400, when mounted on the user's fingers 402, is merely drawn through the hair or fur to clean, condition, etc., as described above.

Figure 40:
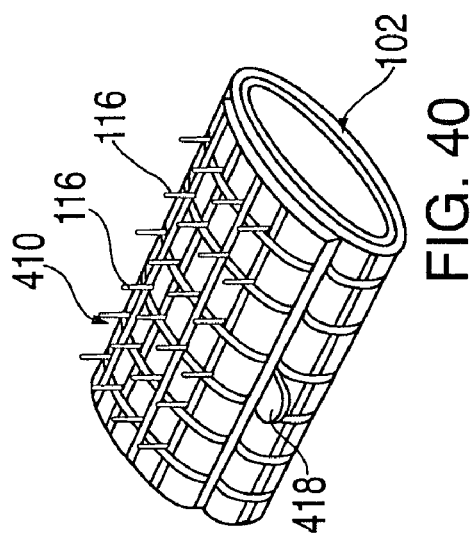
FIG. 40 is a perspective of another aspect of a cleaning element according to the present invention illustrating the mounting of one or scrims on a substrate.
Figure 41:
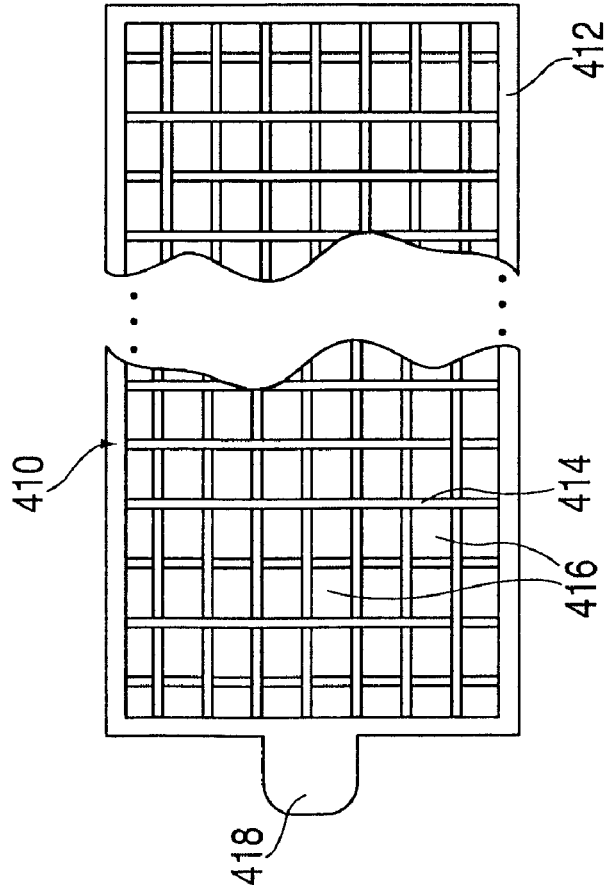
FIG. 41 is a broken plan elevational view of a scrim shown in FIG. 40.

It will be understood that in all aspects of the present invention, the term sheet or wipe illustrated as wipes 120 in various drawing views, is also meant to include a scrim 410 shown in FIGS. 40 and 41. The scrim may be formed of paper, plastic, etc., and has a solid peripheral boarder 412 which surrounds a plurality of criss-crossed strips 414 which form a plurality of apertures 416 therebetween. The scrim 410 may have adhesive applied to an outer surface when disposed on the substrate, for example, in FIG. 40 or on both sides.

The scrim 40 may have any shape so as to be provided as one layer or scrim on one surface of the substrate 102 or, a stack of a plurality of like-shaped scrims 410 mounted on one or two opposed surfaces of the substrate 102. The adhesive coating on one or more surfaces of each scrim 410 holds the scrims 410 together in the stack or buildup on the substrate 102.

The apertures 416 allow the scrims 410 to be inserted over the bristles 410 and onto the base of the substrate 102.

During use, after the outermost scrim is dirty or it is desirable to remove any hair or debris entwined within the bristles 116, an edge or a tab 418 on the outermost scrim 410 is pulled away from the substrate 102 to separate the outermost scrim 410 from the remaining scrims 410 mounted on the substrate 102. During this removal, any hair or other debris entwined on or between the bristles 116 as well as attached to the scrim 410 by means of the adhesive outer coating or layer, is automatically removed from the cleaning apparatus. A fresh, clean scrim 410 is then presented on the substrate 102.

The scrims 410 can also be provided in a continuous roll wound around the substrate 102. In this aspect, individual scrims 410 may be separated from the wound roll of scrims 410 by providing perforations, cuts or notches on the roll of scrims 410 to define individual separable sheets.

What is claimed is:

1. A cleaning apparatus comprising:
a support having a first end, an opposite second end, a longitudinal axis and an outer surface having an oval cross-sectional shape and being fixed to an extended handle at said first end;
a removable flexible mat mounted peripherally on and wrapped around the circumference of said outer surface, said flexible mat having a first surface and an opposite second surface, the mat has one end with a notch or offset portion disposed on said opposite second surface, wherein said notch or offset portion allows overlapping of the other end of the flexible mat when the flexible mat is bent to conform to the shape of said support, and wherein the mat is formed with a border or edge with corresponding apertures formed at one end of the border or edge and projections formed at an opposite end of said border or edge;
a plurality of bristles being disposed on and extending from said first surface of the flexible mat;
a plurality of sheets or wipes disposed over said extending bristles and in a form selected from the group consisting of a stack of separable wipes and a roll of separable sheets or wipes, sheets or wipes being wrapped around said flexible mat starting from an outermost edge disposed in parallel to said longitudinal axis;
wherein the support has a plurality of projecting resilient fingers attached to said opposite second end thereof for slidably facilitating mounting said flexible mat on said support;
wherein each sheet or wipe is formed with a pull tab to enable separation of one sheet or wipe from the other, said pull tab being disposed on and extending transversally from said outermost edge; and
wherein said support is formed with a plurality of apertures to enable dripping or oozing of cleaning fluid retained in said support and to said plurality of sheets or wipes.

2. The apparatus of claim 1 wherein the outermost edges of said sheets or wipes are superimposed on top of each other.

3. The apparatus of claim 2 wherein said oval cross section has two opposed apex and said outermost edges are disposed at one of said apexes.

4. The apparatus of claim 1, wherein said mat has an interior defined within a border or edge and formed with a lattice network of short length segments.

5. The cleaning apparatus of claim 1;
wherein said extending handle has an end cap having an opening for hanging said apparatus.

6. The apparatus of claim 1, wherein said plurality of sheets or wipes is selected from the group consulting of a stack of sheets or wipes and a continuous wound roll of separate sheets or wipes.

7. The apparatus of claim 1, wherein said wipes or sheets are formed of a water insoluble substrate having fibers.

8. The apparatus of claim 7, wherein said fibers are selected from the group consisting of randomly aligned fibers, directionally oriented fibers and a mixture thereof.

9. The apparatus of claim 1, wherein each said sheet or wipe is formed of two or more layers, with each layer of said sheet or wipe being made from a different combination of materials or by a different manufacturing process or a combination thereof.

10. The apparatus of claim 1, wherein each sheet or wipe has a plurality of apertures through which at least some of said bristles are disposed therethrough.

11. The apparatus of claim 1, wherein each said wipe or sheet is loosely woven for defining a plurality of apertures through which at least some of said bristles are disposed therethrough.

* * * * *